(12) United States Patent
Jain et al.

(10) Patent No.: US 12,255,862 B2
(45) Date of Patent: *Mar. 18, 2025

(54) SYSTEMS AND METHODS FOR AUTOMATED MESSAGE DELIVERY FEEDBACK

(71) Applicant: Twilio Inc., San Francisco, CA (US)

(72) Inventors: Prateek Jain, San Francisco, CA (US); Chloe Chen, San Carlos, CA (US)

(73) Assignee: Twilio Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/488,020

(22) Filed: Oct. 16, 2023

(65) Prior Publication Data

US 2024/0048518 A1 Feb. 8, 2024

Related U.S. Application Data

(63) Continuation of application No. 17/447,789, filed on Sep. 15, 2021, now Pat. No. 11,792,149.

(60) Provisional application No. 63/078,471, filed on Sep. 15, 2020.

(51) Int. Cl.
*H04L 51/234* (2022.01)
*H04W 4/12* (2009.01)

(52) U.S. Cl.
CPC .............. *H04L 51/234* (2022.05); *H04W 4/12* (2013.01)

(58) Field of Classification Search
CPC ................................ H04L 51/234; H04W 4/12
See application file for complete search history.

(56) References Cited

U.S. PATENT DOCUMENTS

| | | | |
|---|---|---|---|
| 2004/0006601 A1 | 1/2004 | Bernstein | |
| 2008/0170522 A1* | 7/2008 | Sammour | H04L 1/1877 370/310 |
| 2014/0031070 A1 | 1/2014 | Nowack | |
| 2017/0318439 A1 | 11/2017 | Veerapaneni | |

* cited by examiner

*Primary Examiner* — Benjamin M Thieu
(74) *Attorney, Agent, or Firm* — Lowenstein Sandler LLP

(57) ABSTRACT

Systems and methods for automated message delivery feedback that includes receiving a plurality of messaging requests to transmit a plurality of messages to a plurality of recipient devices, identifying subsets of related messaging requests in the plurality of messaging requests, receiving a plurality of delivery feedbacks for the plurality of messages, for each of the subsets of the related messaging requests, determining, based on the plurality of delivery feedbacks, whether to initiate at least one repeated transmission of a respective message to at least one recipient device, and upon determining to initiate the at least one repeated transmission, monitoring a delivery status of the respective message to the at least one recipient device.

20 Claims, 12 Drawing Sheets

S100

Receiving messaging requests S110

Making messaging attempts S120

Receiving delivery feedback of a message S130

Updating status of at least one messaging attempt S140

SYSTEMS AND METHODS FOR AUTOMATED MESSAGE DELIVERY FEEDBACK

CROSS-REFERENCE TO RELATED APPLICATIONS

This application is a continuation application of co-pending U.S. patent application Ser. No. 17/447,789, filed Sep. 15, 2021, which claims the benefit of U.S. Provisional Application No. 63/078,471, filed Sep. 15, 2020, each of which is incorporated herein by reference.

TECHNICAL FIELD

An embodiment of the present subject matter relates generally to messaging communication and, more specifically, to systems and methods for automated message delivery feedback.

BACKGROUND

Many messaging protocols lack a way of knowing if and when a message is received. In particular, SMS and MMS messaging systems have no native way of knowing if an attempt to deliver a message (e.g., a message attempt) was successful or failed. At times, the senders of a message may make multiple messaging delivery attempts if they believe a message was undelivered.

In some situations, a service or application may use a communication service platform to facilitate delivery of messages. The communication service platform may need to coordinate with multiple external routing providers which can further increase challenges in understanding delivery results. When using a variety of routing providers there may be limited data to inform a communication service on which routing provider is most likely to succeed in a given situation. There are some limited options for users of a communication service to supply feedback if and when a message is received. However, doing so requires significant infrastructure to track and report. As such many systems do not supply feedback and those that do may not do so in a consistent or reliable manner.

Thus, there is a need in the message communication field to create new and useful systems and methods for automated message delivery feedback.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
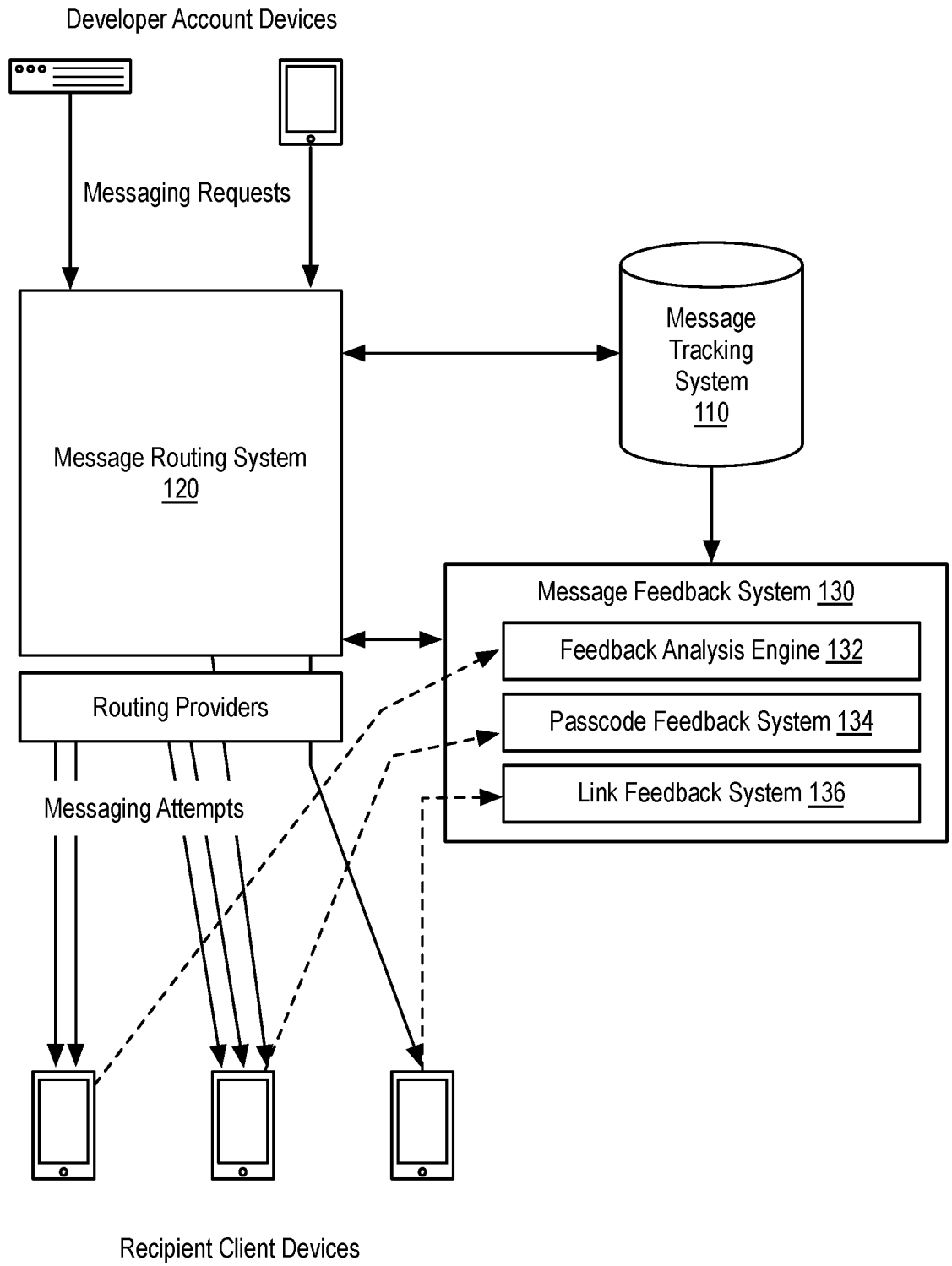
FIG. 1 is a system configuration, according to some example embodiments.

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and non-transitory computer-readable media for receiving messaging requests, transmitting messaging attempts, receiving delivery feedback of a message, and updating status of at least one messaging attempt.

Overview

Systems and methods are described for collecting messaging feedback functions to improve capabilities for a determining message delivery status. These systems and methods can use a message feedback mechanism that makes use of automatic association of deliverability feedback for enhanced sensing of message status.

These systems and methods can use one or more different feedback mechanisms that serve to automate the process by which feedback can be collected. Three exemplary variations of feedback mechanisms include a contextual feedback variation that automates the pairing of feedback with an appropriate messaging attempt based on contextual metadata such as temporal patterns or content patterns, a passcode service variation that adapts passcode usage for monitoring of message delivery, and a link redirection variation that uses a redirecting link to track message delivery status.

These systems and methods can be used to facilitate monitoring deliverability of asynchronous messages sent to one or more destination client devices. These systems and methods can be used to collect deliverability feedback for various communication channels such as SMS (Short Message Service) messaging, MMS (Multimedia Messaging Service) messaging, RCS (Rich Communication Services) messaging, IP (Internet Protocol) messaging, proprietary messaging protocols or Over-the-top messaging (i.e., OTT), and/or any suitable type of messaging channel. These systems and methods may be used for collecting feedback from one communication channel or multiple communication channels.

These systems and methods may be particularly useful for digital communication platforms that make use of external communication systems to facilitate transmitting and delivering messages to one or more destination devices. For example, a communication platform, which may enable programmatically requesting message transmission, may allocate one or more messages to one of a set of message routing services (e.g., cellular network partners), and the message routing service may then facilitate delivery of the message. Such message routing services may have their own internal systems that manage message transmission of message (e.g., possibly transmitting a message to their own set of routing services/networks).

An approach to delivery feedback can automate the process such that the feedback can a stateless feedback mechanism, where the sender of feedback may, in some implementations, be alleviated from storing or maintaining message attempt states or delivery states. For example, a developer integrating with a communication platform may be alleviated from building internal infrastructure (e.g., stateful data records relating to attempts) to track messaging attempts and paring those attempts with received messages.

A contextual feedback mechanism may use relationships between properties of message attempts and received feedback to determine (or predict) associations between feedback and message attempts. In example embodiments, automatic association of deliverability feedback is handled with the appropriate attempt. A passcode variation can utilize recipient usage of a message-delivered passcode as a signal by which deliverability can be determined. A content usage variation can use customer access of a link or other trackable digital resource as a mechanism through which message deliverability can be determined and improved.

These systems and methods may be used within a communication platform that facilitates delivery of messages to a large number of outbound messages. In example embodiments, these systems and methods are implemented by and/or in coordination with a communication as a service (CaaS) computing platform referred herein as a communication platform. A communication platform may be a multitenant computing platform, wherein multiple distinct accounts use the communication platform to facilitate communications.

Examples of a CaaS platform can include one that offers an application programming interface (API) for programmatic control of message transmissions. Another example of a CaaS platform may be one that automates message transmission for a particular use case such as sending marketing messages, customer service messages, authentication-related messages, and the like wherein the CaaS platform may send messages based on state of some digital experience or data.

As one example, these systems and methods may be particularly useful when a communication platform is facilitating use cases where bulk outbound messages are sent to a large volume of recipient devices. In some variations, the messages can be application or programmatically initiated messages. For example, an application may request a marketing message be transmitted to a set of destination devices, and then these systems and methods can attempt to transmit the marketing message to the set of destination devices (using one or more origin endpoints available for use by the application.

In some alternative variations, these systems and methods may additionally or alternatively be used for relaying messages that are relayed through the system and/or originate from an external origin device. For example, these systems and methods may be configured to receive an inbound message from a first user device (e.g., a first phone) and relay that message to a second user device (e.g., a second phone) while confirming delivery of the message.

As another example, these systems and methods may be particularly useful when a communication platform is facilitating use cases where dependability of message delivery is a high priority. These systems and methods can ensure that reliable delivery information can be provided.

In one exemplary implementation, the communication platform may be a general communication service platform enabling messaging capabilities that can be used for any suitable purpose. A developer account can build services or applications that programmatically interface with the communication service for sending or receiving communications or performing other communication tasks.

In other implementations, these systems and methods may be implemented in connection with a computing platform or service used for other uses. The communication platform may be built to facilitate services other than just general communication. For example, the communication platform may be a one-time-password (OTP) service or two-factor authentication (2FA) service that uses messaging for communicating OTP codes to users. In another example, the communication platform may be a booking or customer relationship service that uses messaging as a way of communicating with customers or users. In another example, the communication platform may be a service specializing in delivery and communication of marketing content, alerts, notifications, and/or other content. The communication platform may alternatively be any suitable type of platform used for any suitable purpose that involves sending of messages.

These systems and methods may provide a number of potential benefits. These systems and methods are not limited to always providing such benefits and are presented only as exemplary representations for how the systems and methods may be put to use. The list of benefits is not intended to be exhaustive and other benefits may additionally or alternatively exist.

As a potential benefit, these systems and methods can improve the collection of feedback when sending messages. The improved feedback may be used to provide better analytics and/or data insights into message delivery. The improved feedback may also be used to improve messaging capabilities. In some cases, feedback may be used to inform routing and formatting of messages for improved message delivery. Similarly, these systems and methods may be employed in collecting feedback data to be used in assessing conversion and/or analyzing a recipient's response to messages.

As another potential benefit, these systems and methods enable an easier process by which outside developers provide feedback for a given messaging attempt. In some implementations, the users of a communication services can provide messaging feedback without building complicated infrastructure to support the ability to send feedback. For example, in some variations, an outside system that provides feedback can send deliverability feedback without building and managing stateful data regarding attempts or previously received messages. Through some variations of these systems and methods, developer's computing system may send basic feedback information (message time of receipt, message content, message participant info—origin and destination(s), etc.) which can be extracted directly from the received message. These systems and methods can automatically manage making appropriate updates to tracked message attempts.

As another potential benefit, these systems and methods can fully automate the feedback collection process. When sending passcodes or sending links, the use of the passcodes or access of the links can automatically be integrated into the collection of delivery feedback. This can, in some variations, alleviate an outside service from building supplementary feedback infrastructure if, for example, the outside service makes use of the communication platform for passcodes or communicating links.

In some variations, multiple feedback systems may be used in combination across multiple messages and accounts. In this variation, the way in which feedback is delivered and collected may automatically adapt to the type of message. Automatic message classification may be used to dynamically adapt message transmission and feedback collection to use an appropriate form of feedback collection. For example, a message delivering an OTP can use an OTP feedback collection approach, a message containing a link can use a link-enabled feedback collection approach, and/or another message may receive developer provided feedback.

As another potential benefit, these systems and methods may be used to improve deliverability of messages by using the delivery feedback mechanisms in altering the digital routing/transmission of messages. For example, various network routing options may be used by a communication platform, each with independent performance records regarding reliability and deliverability. These systems and methods may be used to dynamically select routing options based on the delivery feedback.

As another potential benefit, these systems and methods may be used to enable supplemental messaging attempts. The delivery feedback can be used to determine when messages were successfully delivered and/or unsuccessfully delivered, and then automatically reattempting transmitting a message.

As shown in FIG. 1, a system for collecting messaging feedback can include a message tracking system 110, a message routing system 120, and at least one of a set of possible message feedback systems 130. The system functions to provide an enhanced and more automated way to track message delivery. The system may additionally or alternatively be used for improving message deliverability when using delivery feedback to determine how to transmit subsequent messages.

The system may be implemented within a communication platform. The communication platform can include an API. The API may be used by an external digital application or service to manage requesting of messages. The API may additionally be used in managing or inspecting delivery status of one or more messages. The API may additionally be used in communicating delivery feedback and/or otherwise interacting with the communication platform. Alternatively, the communication platform may include any suitable type of interface for requesting, managing, or setting up a digital service that would result in transmission of outbound messages.

The API of the communication platform may be any suitable type of API such as a REST (Representational State Transfer) API, a GraphQL API, a SOAP (Simple Object Access Protocol) API, and/or any suitable type of API. In some variations, the communication platform can expose through the API, a set of API resources which when addressed may be used for requesting different actions, inspecting state or data, and/or otherwise interacting with the communication platform.

A REST API and/or another alternative type of API may work according to an application layer request and response model. An application layer request and response model may use HTTP (Hypertext Transfer Protocol), HTTPS (Hypertext Transfer Protocol Secure), SPDY, or any suitable application layer protocol. Herein HTTP-based protocol is described, but it should not be interpreted as being limited to the HTTP protocol. HTTP requests (or any suitable request communication) to the communication platform may observe the principles of a RESTful design or the protocol of the type of API. RESTful is understood in this document to describe a Representational State Transfer architecture as is known in the art. The RESTful HTTP requests may be stateless, thus each message communicated contains all necessary information for processing the request and generating a response. The API service can include various resources, which act as endpoints that can act as a mechanism for specifying requested information or requesting particular actions. The resources can be expressed as URI's or resource paths. The RESTful API resources can additionally be responsive to different types of HTTP methods such as GET, Put, POST and/or DELETE requests.

The message tracking system 110 functions to track information used to track multiple messaging attempts. The message tracking system 110 can be or include a database or other data modeling system that stores data records associated with messaging requests, message attempt information (e.g., message attempt time, message transmission configuration, etc.), and/or any related delivery feedback information. The message tracking system 110 may track message requests and resulting messaging attempts independently from other message requests/attempts. However, in some implementations, the messaging tracking system 110 may track associated message attempts, wherein multiple attempts to communicate the same message or an equivalent message may be linked within the message tracking system 110.

The message tracking system 110 may be integrated into the message routing system 120 and the message feedback system 130. Outbound messages and/or message requests that are processed by the message routing system 120 can be logged and tracked by the messaging tracking system 110.

In example embodiments, the message tracking system 110 includes a data record tracking a message transmission attempt. The data record can include or reference data related to transmission properties such as: time of transmission attempt, the message transmission configuration (e.g., the routing service option used), other transmission options (e.g., format or parameters of message), message content, origin endpoint (e.g., endpoint/phone number that is used to indicate where the message originated), destination endpoint(s), and/or other properties of how the message was sent.

As described, in some variations, the message tracking system can include data associations between data records to track related messaging requests and/or attempts. Herein, messaging requests/attempts are related when messages share the same intent of communicating a shared message to one or more destination devices. Multiple attempts may be made at different times, using different routing services, and/or using other options if and when there is no delivery confirmation.

In one variation, the system can include a message classifier module that processes a message request and determine associations with other messaging requests. Related message requests will generally be triggered externally when an outside service is unsure if a message was delivered and wants to reattempt delivery. For example, multiple requests/attempts to send the same order confirmation message to a customer may be classified as being directly related message requests/attempts. In one variation, the message classifier module may use or include a machine learning classifier model (e.g., a trained model) that can classify two or more message requests as being elated.

The message routing system 120 functions to process a messaging request and transmits a message to a recipient device.

A message request can be a set of properties that define parameters of transmitting a message. The message request can include properties to indicate one or more destination devices. In one variation, when more than one destination device is specified, the different destination devices may be intended for messaging individually. In an alternative variation, when more than one destination device is specified, those destination devices may be recipients of a group messaging communication. The message request may additionally include message content, which defines the content for delivery, which could be text, media files, and/or other forms of content. The message request may also specify other details like the origin endpoint to use for sending and other options. In one variation, the message request may include one or more properties used to indicate if and the type of message delivery feedback to use. For example, a message request may include a property to enable link-based delivery feedback.

In one variation, a messaging request can map directly to one messaging attempt. For example, one request is issued for each message that is attempted to be sent to a destination device. However, some variations or instances of use for the system may have messaging requests map to messaging attempts in other ways. In one such variation, a messaging request may initiate multiple messaging attempts. In some instances, one messaging request may result in attempting delivering the same message content in independent messages to multiple distinct destination devices (e.g., bulk sending). In other instances, one messaging request may result in repeated attempts of delivering a message to one destination device, which functions as an automatic reattempt of transmission for one request.

The message routing system 126 may service messaging requests that are received through an application programming interface (API) or received in another manner. Alternatively, the message routing system 120 may receive inbound messages or communications and then reroute the messages to one or more recipient devices. The recipients may be specified as destinations through an endpoint identifier such as a phone number, an email address, an account identifier, and/or any suitable endpoint identifier.

The message routing system 120 in example embodiments, integrates with one or more routing providers to facilitate transmitting outbound messages and possibly receiving inbound messages. In one variation, the selection of a given routing provider is based in part on earlier delivery feedback. For example, analysis of delivery feedback for a set of routing providers may be used to select the most reliable routing provider for a given message.

Accordingly, the message routing system 120 may include a set of routing services available to facilitating transmission of outbound messages. More specifically, the message routing system 120 can include interfaces to the set of routing services. The different routing services can include different carrier networks, mobile network SMSCs (Short Message Service Centers), messaging gateways, and/ or other systems used to relay a message to a delivery device. These various routing services may also use additional downstream routing services. In some variations, this may result in the communication platform being several stages removed from the eventual delivery of a message a destination device. Integration and use of the message feedback system 130 can enable the communication platform better manage reliability and responding to delivery of messages.

The message routing system 120 may include a routing engine that uses route service data to determine which route service to use for message attempts. The message tracking system 110 can track the route service used for various message attempts, and this data may be used in determining which routing service to use for subsequent messages including other attempts of delivering a message. Determining a route service for a message attempt can depend on delivery success for various candidate routing services, the type of message, stated or predicted urgency of a message request, routing services used in previous message attempts for the same/related request, pricing of routing services, capacity/usage of routing services, and/or other factors.

The message routing system 120 may additionally include a message reattempting engine, which functions to manage automated attempts of delivering a message. The message reattempting engine can initiate subsequent message attempts after an initial message attempt based on various conditions. The message reattempting engine can use delivery feedback data of the message tracking system 110 to predict when a message reattempt should be transmitted. Time between attempts, the type of message, the patterns of delivery to a particular destination, message delivery performance of a used routing service, and/or other factors can be used in evaluating conditions for when a message is sent.

The message feedback system 130 functions to collect and process feedback data. The message feedback system 130 may be or include one or more of the following types of feedback systems: a feedback analysis engine 132, a passcode feedback system 134, and a link feedback system 136. These exemplary feedback system variations may be used independently or in combination. For example, in example embodiments, a communication platform may have: messages communicating OTP codes automatically use the passcode feedback system 134, messages including a link automatically use the link feedback system 136, and any other delivery feedback information processed by the feedback analysis engine 132.

In one variation, the system may include (e.g., as part of the message routing system 120 and/or the message feedback system 130) a message analyzer module, which functions to analyze a message request to determine a form of message feedback to enable for the message. In particular, the message analyzer module may detect message requests classified as a passcode message and/or a message with linked content.

Passcode messages may be any message that includes a code to be used for some action by the user. One particular use case is where passcodes are used as a second factor of authentication. In other use cases, a passcode could be used for a coupon or any suitable interaction. In addition to message content corresponding to patterns of a passcode message, the message request may also be confirmed to be compatible for passcode feedback. For example, an account from which the message request originates may have an account setting to indicate they have passcode feedback enabled. In another example, the system could use previous passcode interactions by the account to confirm the message is compatible for passcode feedback. For example, if the system is used in facilitating OTP/2FA authentication, the established use of the system can indicate that passcode feedback can be performed for the message request.

In a message with link content (i.e., a link-content message), one or more URI (Universal Resource Identifier), such as a URL (Universal Resource Locator), can be detected within the content. Presence of such a link may enable a link feedback system 136 to use a redirecting link as a replacement for the purpose of detecting delivery and access of the link. In some instances when there is no link, a message may still be compatible with a link feedback system if there is some portion of content that can be converted for remote hosting and converting into a message link. In some variations, media content (audio, video, images, text, etc.) may be altered so as to not be directly communicated but to be hosted and included in a message through a link.

Figure 2:
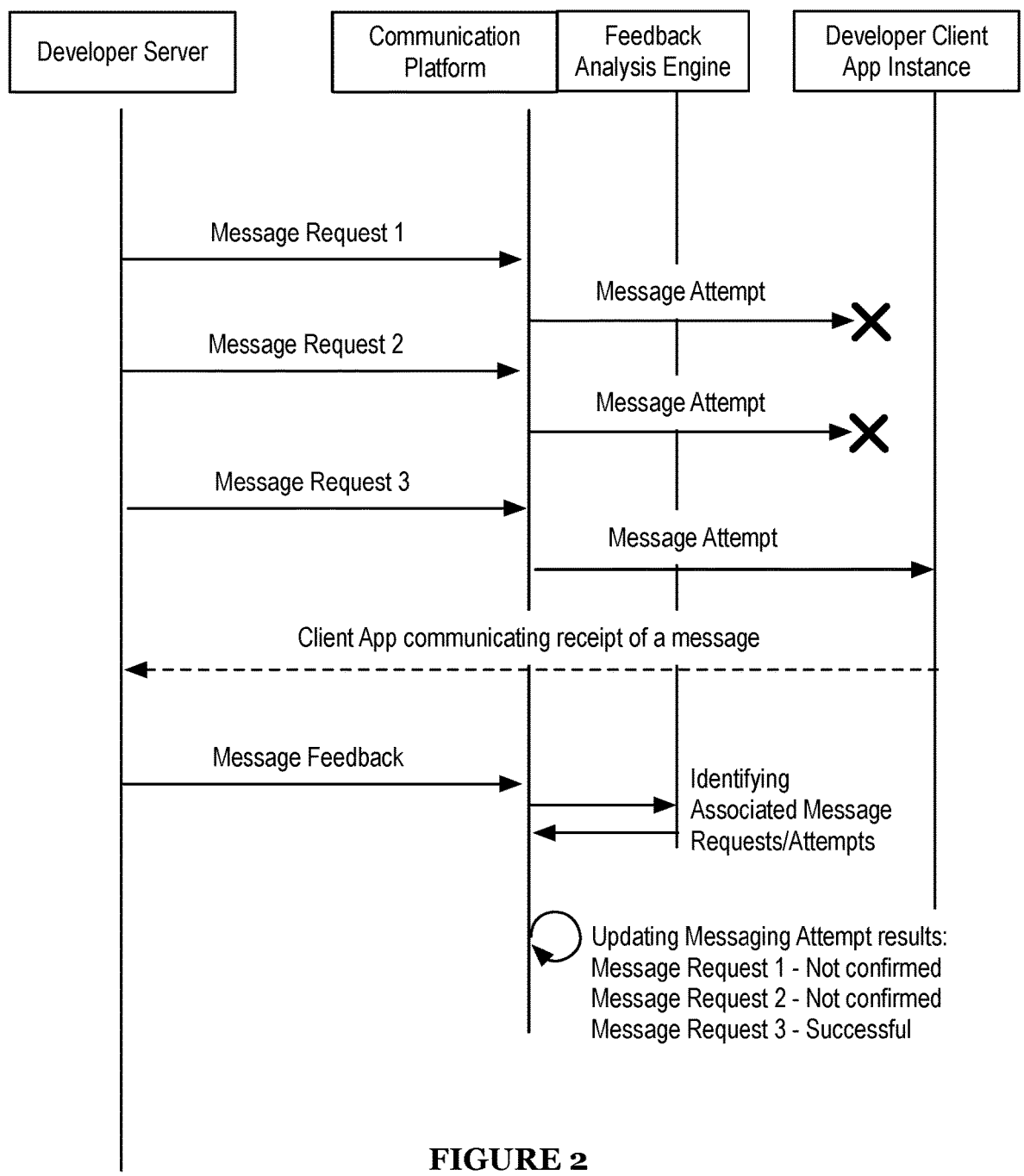
FIG. 2 is a communication flow diagram of a variation with contextual association of delivery feedback.

As shown in FIG. 2, one variation of the message feedback system 130 utilizes a feedback analysis engine 132, where delivery feedback can be contextually and automatically paired with a messaging attempt. In this variation, a developer can be alleviated of building custom message tracking infrastructure and only focus on providing feedback information. A feedback analysis engine 132 functions to automate the mapping of received feedback to appropriate messaging attempts. The feedback analysis engine 132 can use various heuristics and/or analysis processes to complete this.

In one variation, the feedback analysis engine 132 can automatically determine an association between related message requests and/or attempts. Configuration to establish this association can perform analysis on message content, timing of the request or attempts, and/or using other identifying signals.

In example embodiments, the feedback analysis engine 132 uses a temporal proximity heuristic. Received delivery feedback is related back to the most recent messaging attempt and request matching the basic parameters of the delivery feedback. The delivery feedback may provide the end client identifier like a phone number or account ID and/or optionally the message content. This received delivery feedback can be treated as explicit indication of the delivery status. Earlier attempts that have been associated with but are for a different attempt or request may not receive any delivery feedback. However, the feedback analysis engine may update the message tracking system 110 to indicate an implicit delivery status. For example, a first message attempt may be updated to a delivery state indicating an implied or likely failed delivery if a second associated message attempt received positive delivery feedback.

As another variation, the feedback analysis engine 132 may use timing as another condition for how to pair delivery feedback with message requests/attempts.

If delivery feedback is received within a predefined time response window, then the delivery feedback may be associated with the most temporally proximate message request/attempt. The time response window may be a time window threshold defining when a received response is directly associated with the most recent messaging attempt. If the delivery feedback falls outside of the time response window, then it may be treated differently.

As a first exemplary scenario, a first message attempt is transmitted at 1:00 pm and a second message attempt is transmitted at 1:15 pm. If a message response is received from the recipient between 1:15 pm-1:20 pm then that may be interpreted as an explicit indication of a successful delivery of the first message attempt. If the message response is received later than the time response window (e.g., at 1:30 pm) then there may be insufficient evidence on which message attempt triggered the response. Both messages may be marked as possible delivery successes. Assuming the message content was the same, then the messages could have a delivery status indicating the message content was successfully completed, but without stating which attempt was successful or unsuccessful. For example, an application may communicate feedback that a particular destination number supplied the right OTP code but may not offer information on which OTP code or which original message attempt was involved. In this example, an analysis of timing of the messaging attempts and the received feedback can be used.

In another exemplary scenario, feedback may be provided or determined for each messaging attempt. In this exemplary scenario, timing properties of feedback relative to messaging attempts may not be used.

The time window threshold may additionally be variable based on the timing of message attempts. The duration of the time window threshold may be directly related to the time between message attempts.

Figure 3:
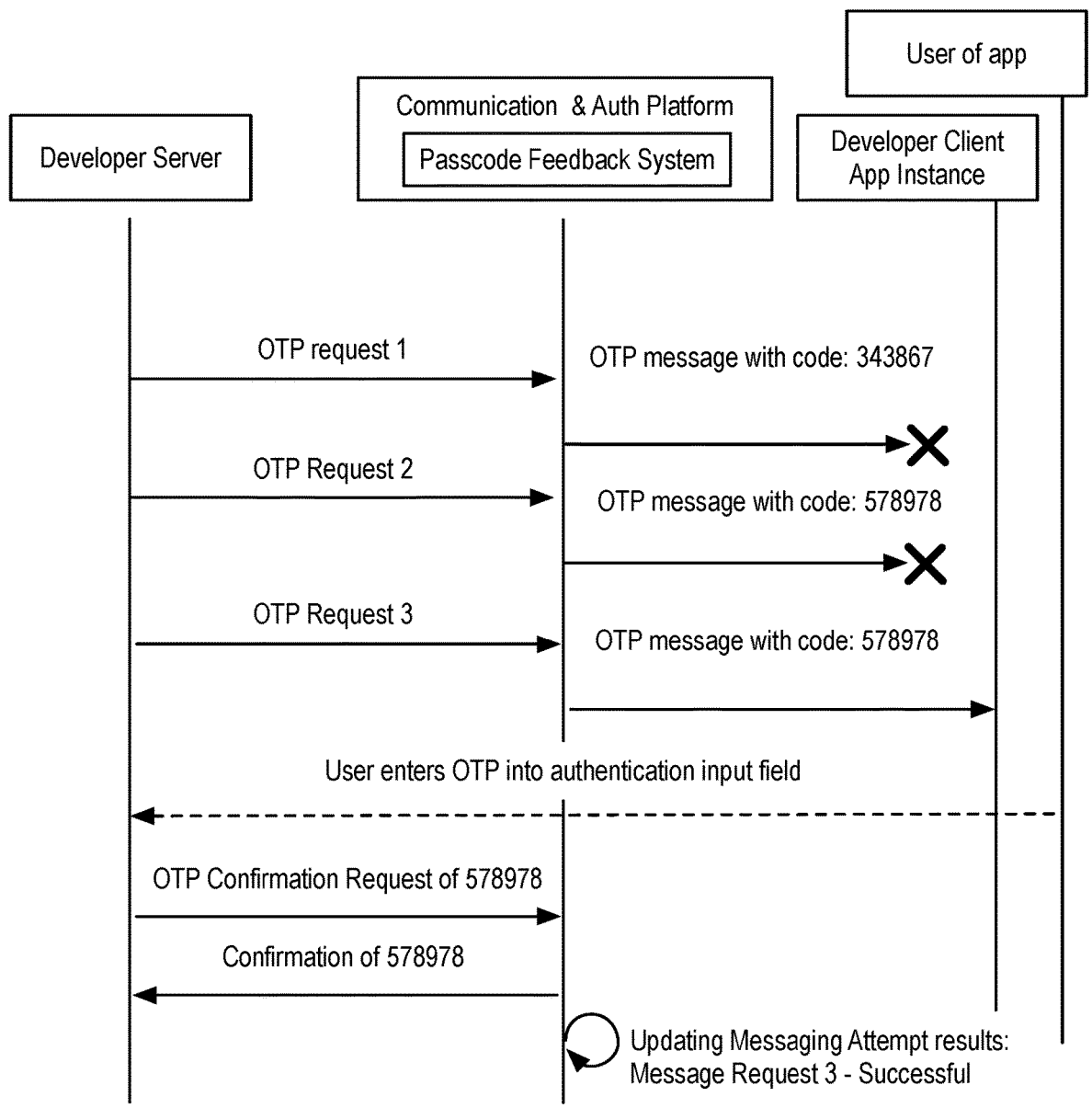
FIG. 3 is a communication flow diagram of a variation using a passcode feedback system.

As shown in FIG. 3, another variation of the message feedback system 130 utilizes a passcode feedback system 134, which functions to enable automatic feedback collection for messages used in delivering passcodes and/or one-time passwords (OTPs). The passcode feedback system 134 uses the communication of a passcode and the use of that passcode by a recipient user as a way of monitoring delivery (and response) to a message. The passcode feedback system 134 generates unique passcodes for different messaging attempts so that it can determine which attempt was successful. If a passcode of a messaging attempt is confirmed in an authentication challenge (e.g., entered into a multi-factor input field), then that is a signal that the messaging attempt was successful. If an incorrect passcode is entered, that may be an indication that a message was received but somehow corrupted. If a new passcode is generated or a message is requested to be resent, then the previous messaging attempts may be updated to indicate possible delivery failure or other suitable issues.

The passcode feedback system 134 can be part of or connect to an authentication engine. In particular, the passcode feedback system 134 can be integrated with a passcode multi-factor authentication engine that facilitates a passcode-based authentication process. For example, the communication platform may also provide multi-factor authentication services including delivery and confirmation of one-time passcodes communicated to personal devices of a user (e.g., destination devices).

Figure 4:
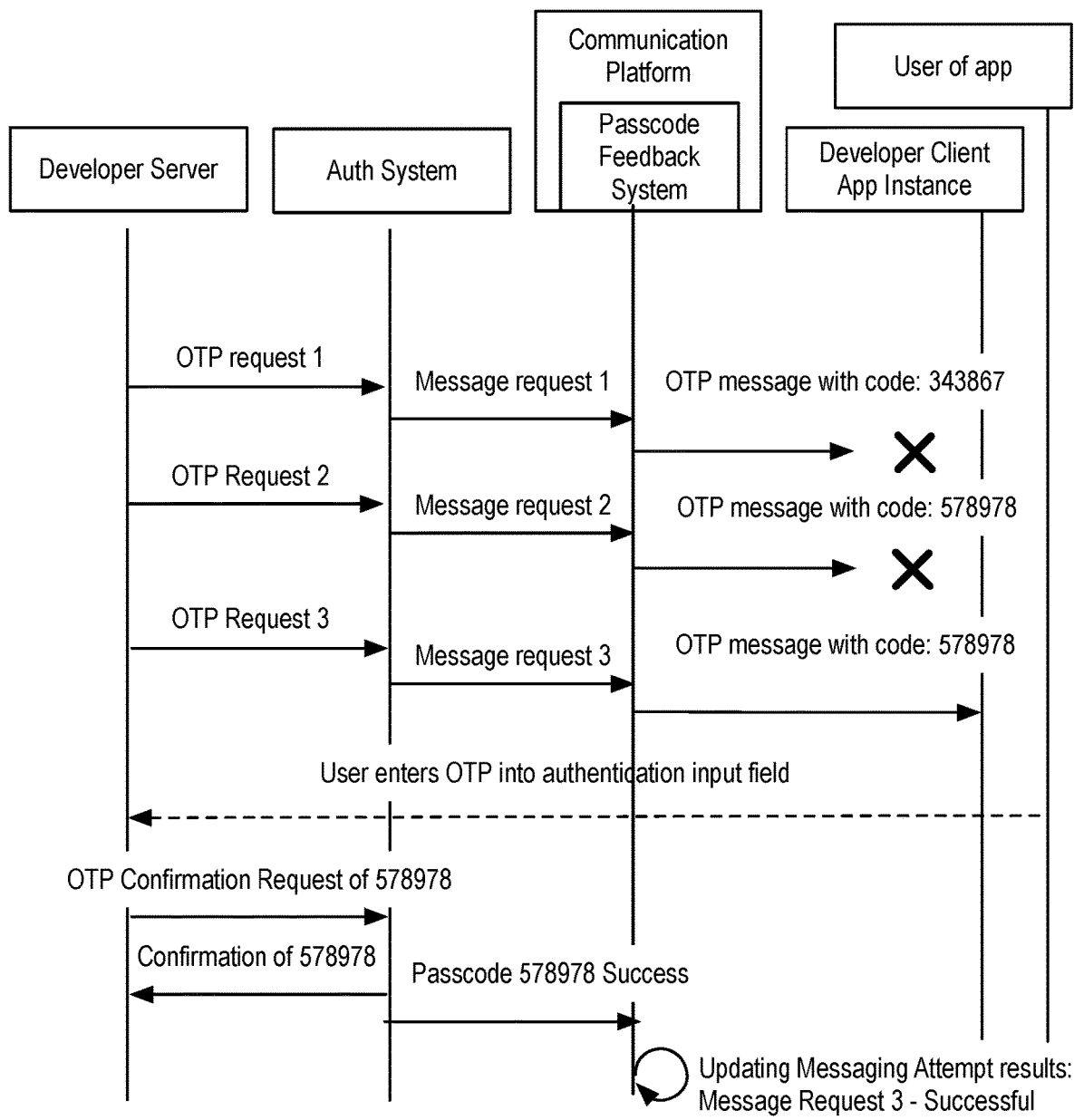
FIG. 4 is a communication flow diagram of a variation using a passcode feedback system with an external multi-factor authentication system.

In another variation, the passcode feedback system 134 may leverage an external authentication system as shown in FIG. 4. In one variation, outbound messages may be parsed for potential passcodes or OTPs, while a client-side module (or a server-side module of the external authentication system) detects the use of such passcodes and uses the detection of a matching passcode as indication of message delivery success. Messages detailing passcode usage can be received by an external client-side module and/or a a server-side module (e.g., from a server of the external authentication system). Accordingly, in some variations, the system may include a passcode feedback library or SDK that can be included or packaged with a client application or service. In one variation, the communication of a detected passcode may be encrypted or potentially hashed such that the passcode feedback system can determine a match between a transmitted passcode and user entered passcode, which would indicate message delivery success.

Figure 5:
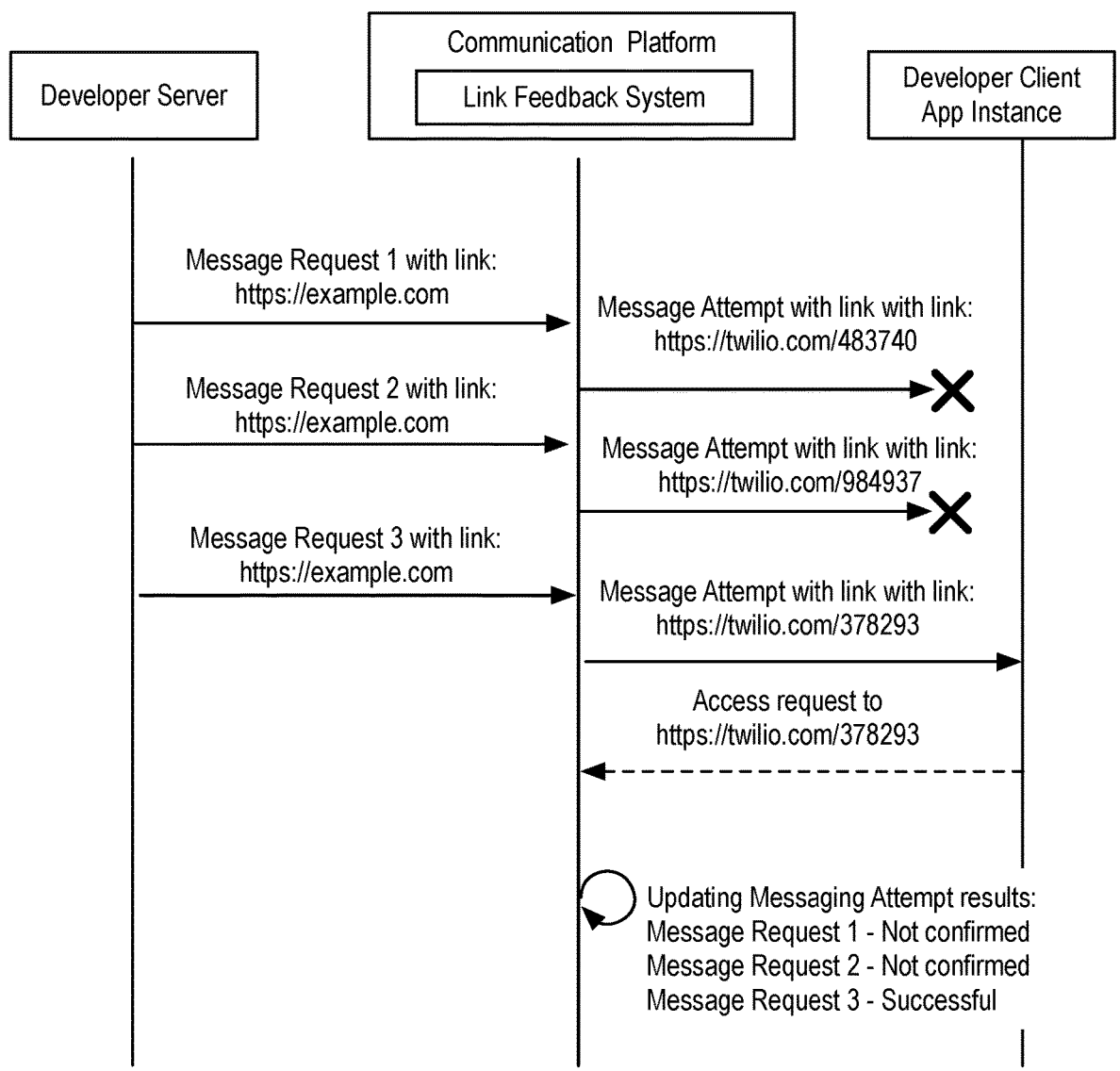
FIG. 5 is a communication flow diagram of a variation with a link feedback system.

As shown in FIG. 5, another variation of the message feedback system 130 utilizes a link feedback system 136, which functions to convert links in the message content so that access of the links can be used to detect delivery. The link feedback system 136 may be integrated into the message routing system 120 to transform one or more links (e.g., URLs) within the message content. If a link in the message content is identified, the link is changed to a redirected link so that the link references a web resource of the communication platform, which will then detect the access request and redirect to the original link destination. For each messaging attempt a unique redirecting link is generated so that access to each message can be tracked. In some instances, the link feedback system 136 may include configuration to distinguish between a client applications access of the link to generate a preview image and an access request from a user (e.g., as a result of clicking the link and opening the link on a browser). In this way, the link feedback system 136 may track delivery success and engagement with the message. For example, delivery success may be detectable without user explicit interaction (e.g., clicking/accessing link) by sing automated access by a destination device. Destination devices (e.g., phones) may access a link to retrieve a link summary, thumbnail, or other content. This form of access could be detected through the user agent or classified patterns of access. This device-initiated access can indicate successful delivery independent of a user actually viewing or accessing the link. Additionally, or alternatively user access of a link can be detected based on user agent and patterns of access and be used to indicate successful delivery and user engagement. The link feedback system may include options to enable or disable the usage of redirecting links.

Figure 6:
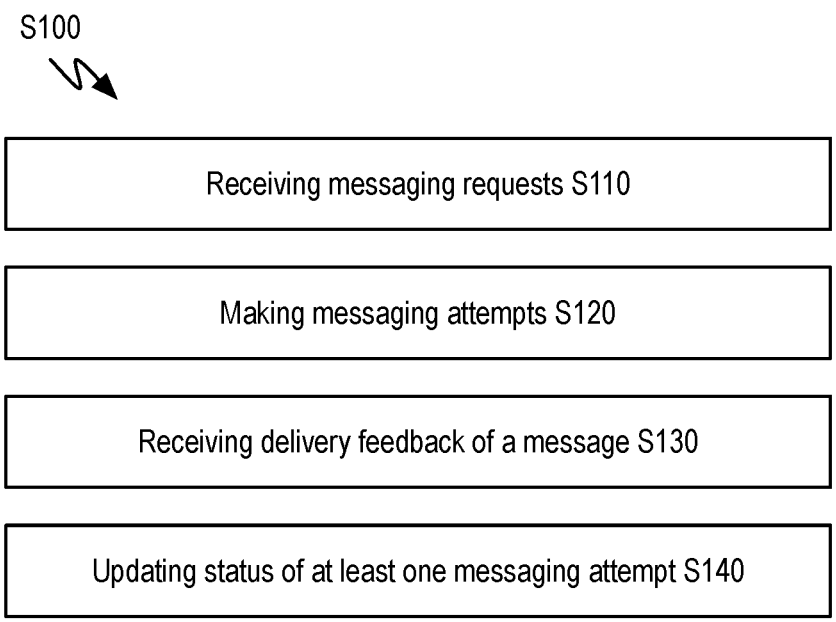
FIG. 6 a flowchart showing an example method for collecting messaging feedback, according to certain example embodiments.

As shown in FIG. 6, a method S100 for collecting messaging feedback can include receiving messaging requests S110, making (e.g., transmitting) messaging delivery attempts S120, receiving delivery feedback of a message S130, and updating status of at least one messaging attempt S140. The method may be used to automate collection and/or interpretation of message delivery feedback. In some variations, the method can enable received delivery feedback to be automatically mapped to appropriate messaging attempts. In some other variations, the method can enable delivery feedback to be determined based on actionable content of an attempted message. For example, usage of a passcode that was in an attempted message can be used as a signal indicative of delivery success or failure. In another example, access to a link in the content of an attempted message may be additionally or alternatively be used as a signal indicative of delivery success or failure. In such ways, the method may enhance a communication system's ability to collect feedback more reliably and more widely regarding the results of transmitting a message. Additionally, the method may alleviate the technical responsibilities of the system reporting feedback (e.g., tracking attempts and mapping messages to attempts), thereby making delivery feedback more easily implemented. The method may be used to improve reporting of message deliverability (e.g., updating user interfaces of a user device or a user interface of an administrative console), altering the routing and communication of subsequent messages, altering automated messaging attempts, and/or facilitating other functionality within a communication system.

The method may be implemented by a system such as the one described above or a variation of such a system. The method may alternatively be implemented by any suitable system. In particular, the method can be implemented at a communication platform that includes one or more processors and one or more computer-readable mediums (e.g., non-transitory computer readable mediums) storing instructions that, when executed by the one or more computer processors, cause the system to perform operations comprising processes and/or variations of the processes described herein.

In one method variation, the method S100 can include: receiving a set of messaging requests to transmit a message to at least one recipient device (S110); making a set of messaging attempts, each of the set of messaging attempts including an attempt to deliver the message to the at least one recipient device (S120); receiving delivery feedback and automatically associating the delivery feedback to one messaging attempt of the set of messaging attempts (S130); and updating a delivery status of the at least one messaging attempt. Automatically association the delivery feedback to one messaging attempt may be particularly useful within communication platforms that use external routing services that are delegated responsibility in facilitating transport of a message to a destination device.

Figure 7:
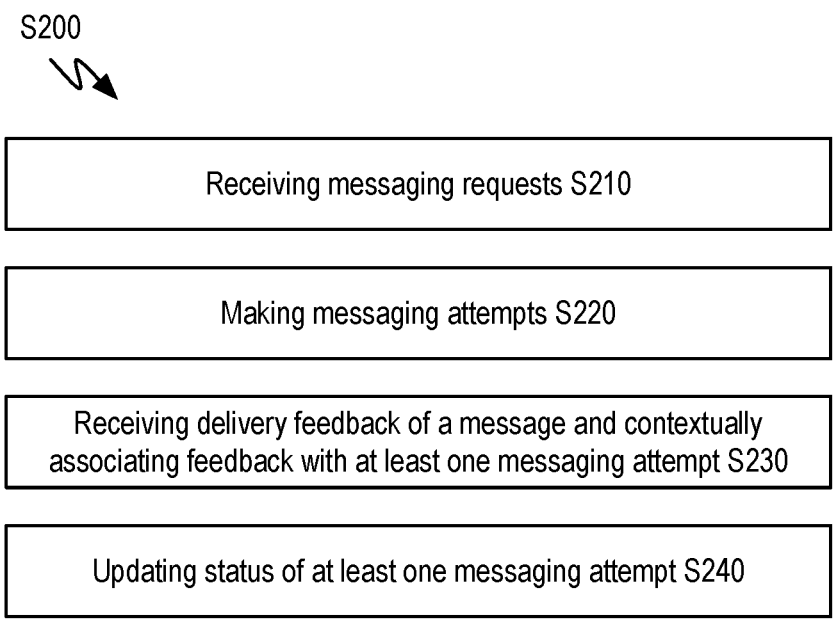
FIG. 7 a flowchart showing an example method variation collecting messaging feedback and contextually associating feedback with at least one messaging attempt, according to certain example embodiments.
Figure 8:
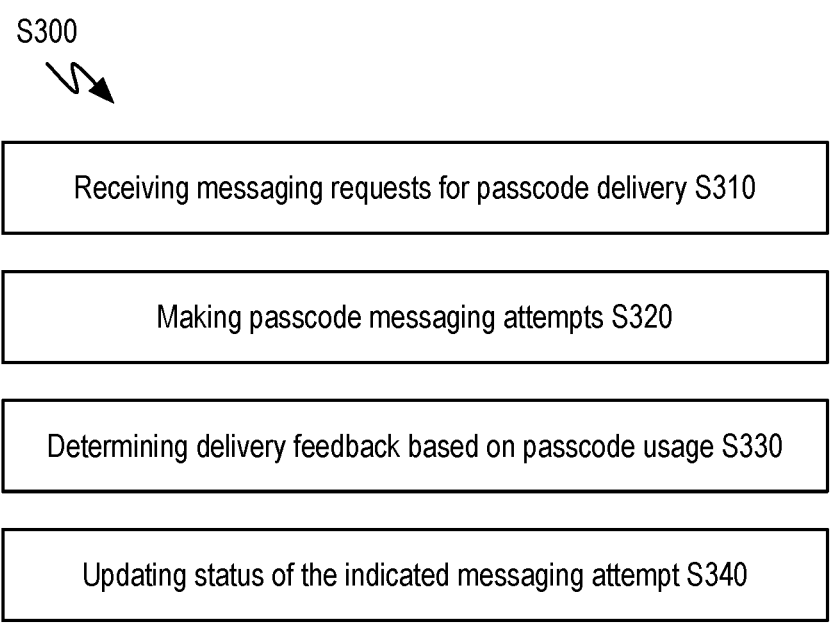
FIG. 8 a flowchart showing an example method variation collecting messaging feedback based on passcode usage, according to certain example embodiments.
Figure 9:
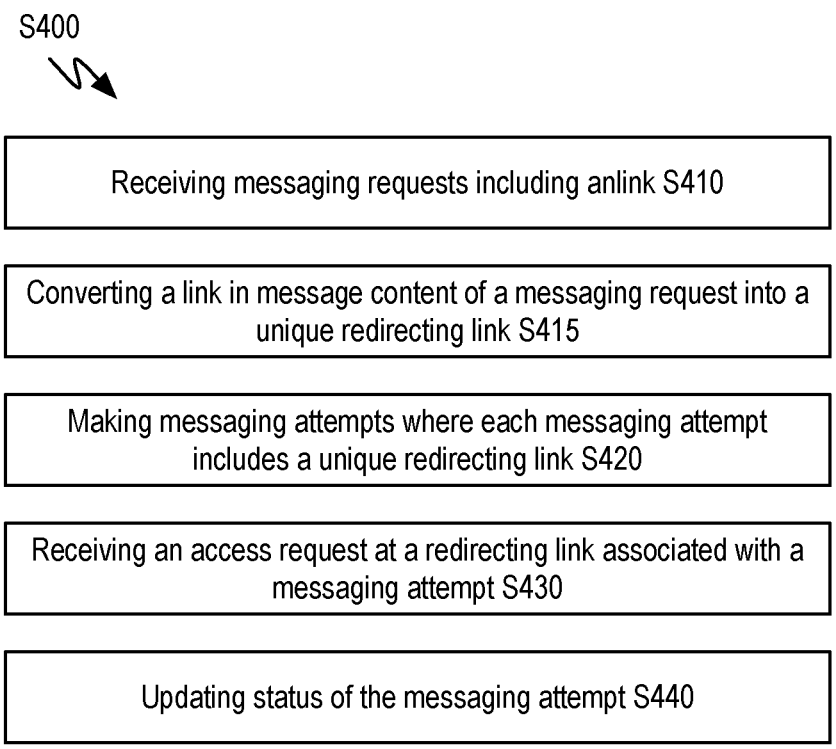
FIG. 9 a flowchart showing an example method variation collecting messaging feedback based on redirecting links, according to certain example embodiments.

The method can employ one of a variety of feedback collection mechanisms. The method may be implemented in connection using a contextual feedback variation S200 as shown in FIG. 7, a passcode service variation S300 as shown in FIG. 8, and/or a link redirection variation S400 as shown in FIG. 9. These variations may involve various subprocesses applied within the main feedback method processes of S110, S120, S130, and S140 described herein.

Variations of the method may be implemented to enable one of such feedback collection mechanisms. In other variations, two or more feedback collection mechanisms may be used in combination. In one such variation, the method can include analyzing a message request and selecting a feedback collection process and then conditionally using one or more feedback collection process (e.g., selected from the set of a contextual feedback, passcode feedback, and/or link redirection feedback).

Block S110, which includes receiving messaging requests, functions to initialize a messaging attempt. More specifically, receiving message requests includes receiving a set of messaging requests to transmit a message to at least one recipient device. Each request can specify message content for delivery (i.e., attempted delivery) to one or more recipient device (e.g., a mobile phone or app). The set of messaging requests may be received together or collectively over time.

The messaging requests may originate from any suitable sources. Examples of some sources of a messaging request can include programmatically initiated messaging requests and inbound messaging requests. Herein the messaging requests are described as originating or being initiated in association with an account or sub-account of a communication platform. However, any suitable entity may initiate the messaging requests.

Programmatically initiated messaging requests may be messages that are initiated independent of an initiating communication (e.g., application initiated and not caller initiated). Programmatically initiated messages may be initiated by receiving an API messaging request, processing a messaging request instruction within some programmatic logic, and/or executing any suitable logic that results in initiating a new outbound message. In one example, an API request may be communicated from an external service to a communication platform. In another example, an instruction may be triggered in response to a user initiated messaging request made through an administration user interface.

In another variation, an inbound message may be received at the communication platform, which triggers the redirecting of the content of the inbound message to one or more recipients. The communication platform may include message forwarding logic, application logic, or other suitable rules that determine if, when, and/or where to redirect communication. In the case, where the communication platform is a carrier network system that provides message communication services, the intended recipient destination (s) may be specified within the properties of the inbound message.

A messaging request may be made for the asynchronous communication of text, image, video, and/or other suitable media message. The communication channel or protocol in which the messaging request may be preset or limited to one form of messaging. Alternatively, the method may facilitate communication over one or more different communication channels. Possible messaging channels can include SMS, MMS, RCS, IP messaging, proprietary messaging protocols (e.g., OTT), and/or any suitable type of messaging channel. In some variations, the messaging requests can also be implemented through other communication channels such as a synchronous voice channel. For example, a message or communication may be made as an automated phone call.

A messaging request can include message content, one or more recipient/destination endpoints, one or more origin endpoints, and/or other messaging properties or options. The message content can be text and/or media files (e.g., images, audio, videos, documents, etc.), and/or any suitable message payload supported by the communication channel. The recipient/destination endpoint is an address linked to one or more destination devices. The destination endpoint can be a phone number, an email address, an account name, or any suitable type of identifier used in determining what end device(s) should receive the message. The origin endpoints can be the same type of endpoint as the destination endpoint, although the method may support messaging between different channels which use different types of endpoints. In programmatically initiated messages, the origin endpoint may not map to an end client device but can instead be an endpoint usable by the communication platform for listing the origin endpoint of the message. For example, on the destination device, a received SMS message would appear to come from another phone number. In some cases, different accounts on the communication platform may have different origin endpoints registered and available to use for that particular account.

The messaging request will generally be used to direct the attempted transmission of the message content to the one or more recipient endpoints. The message will be transmitted so as to indicate the message originates from the origin endpoint (or one of the possible origin endpoints). In one variation, a bulk-messaging request may specify a plurality of recipients that are specified as recipients of the message. In another variation, a recipient endpoint may be specified as a messaging group destination. A messaging group destination specifies deliver of the message to a communication thread where multiple parties are recipients of messages within a unified communication thread (e.g., a group chat group).

The method may involve the processing of multiple messaging requests and message transmission attempts. Within the context of attempting to send a particular message to one or more recipients, the way in which multiple messaging requests are received can vary.

In one variation, each message request may be associated with one attempt of message transmission. In this way, different message transmission attempts may be independent within the communication platform. For example, a developer may make multiple API-based messaging requests for communicating a particular message to a particular recipient or group of recipients. After a first attempt, a system on the developer side may determine that another attempt is needed. Multiple attempts may be made, but there may be no explicit association or link between these attempts.

In one variation, method may include automatically associating messaging attempts. Automatically associating messaging attempts may include establishing an association between messaging requests based on temporal conditions, message content conditions, recipient conditions, and/or other patterns in the context of received messaging requests. For example, if the message content and recipient information is substantially the same between two messaging requests made within some time window of separation (e.g., between 2-15 minutes apart), then the system may automatically associate these as related messaging attempts. Association of related messaging attempts may be used for group reporting of message delivery. For example, delivery feedback for one of the attempts may result in updating delivery status of all related messaging attempts.

In another variation, repeated messaging requests may be explicitly indicated within the messaging request. In example embodiments, a messaging request may indicate a message communication identifier. Message communication attempts that are associated can specify the same or linked identifiers. In another implementation, subsequent messaging attempts are made by explicitly receiving a request to reattempt message transmission. For example, a messaging API may enable a developer to make an initial messaging request and then to subsequently make a request to reattempt transmission of the messaging request. In one variation, such a messaging attempt variation can enable the communication platform to intelligently reattempt bulk message transmission to only the recipients where delivery is unconfirmed. In a similar variation, the communication platform may provide a feature wherein subsequent message communication attempts are automatically initiated based on if and when a message is determined to be unreceived.

Block S120, which includes making messaging attempts, functions to transmit or initiate communication of a message thereby attempting delivery of a message that is based on a messaging request. More specifically, making messaging attempts includes making a set of messaging attempts (e.g., initiating transmission of a set of messaging directed at at least one recipient device). Each of the set of messaging attempts can include an attempt to deliver the message to at least one recipient device.

A messaging attempt may be made for a received messaging request. There may be at least one transmitted message for each messaging request. However, in some instances, a messaging request may not result in a transmitted message if it is determined that an earlier attempt was successful. In other words, if received delivery feedback indicates success of an earlier associated messaging attempt, then subsequent messaging requests for that recipient may be canceled or otherwise prevented from repeated delivery.

A messaging request may not result in a transmitted message attempt in other potential scenarios, depending on implementation, such as if there was an error in the messaging request, if an endpoint is determined to be unreachable based on previous failures in message feedback, and/or in other scenarios.

The method may operate and automate mapping of delivery feedback across a number of different messaging intents (different combinations of message content, participants, and/or context) and associated messaging attempts.

Depending on implementation and/or the type of messaging request, one variation may result in, for one messaging intent, multiple messaging requests being made for multiple messaging attempts. For example, there may be multiple messaging requests and resulting messaging attempts for sending a coupon code to a phone number.

Depending on implementation and/or the type of messaging request, one variation may alternatively result in one messaging request for multiple automatically triggered messaging attempts for a single intent. As an alternative to the example above, one messaging request (possibly with indication of an auto-retry option enabled) may result in repeated attempts of transmitting the coupon code message (possibly using different message transmission configuration as described below) to the phone number.

A messaging attempt may additionally be made for a plurality of recipients for a given messaging request if, for example, the messaging request is a bulk messaging request. This would be an example of a messaging request indicating a plurality of messaging intents (e.g., same message sent independently to different destination devices). In other words, for one received messaging attempt listing message content for independent delivery to a set of destination devices, Block S120 can include making a set of messaging attempts, where each messaging attempt is to one in the set of destination devices.

Transmitting messaging attempts can include selecting message transmission configuration, which functions to set transmission options for a given messaging attempt. The message transmission configuration can be varied for different recipients, different attempts, and/or other scenarios. Selecting message transmission configuration can include selecting a message routing option. Selecting message transmission configuration can additionally or alternatively include preparing message content and/or properties for transmission.

In one variation, transmitting messaging attempts involves diversifying messaging attempts of associated message requests. Accordingly, selecting a message transmission configuration can include selecting and/or setting message transmission configuration of a subsequent message attempt to differ from message transmission configuration from an earlier message attempt. For example, a different routing option may be selected for a subsequent message attempt. In another variation, the message content encoding, or formatting may be altered to differentiate from previous messaging attempts. Diversifying messaging attempts functions to test and/or explore different transmission options to in case earlier message transmission configuration was a cause of a failure in delivering a message to a recipient.

Selecting a message routing option functions to select one of a variety of message routing options. A message routing option can include a messaging protocol or channel such as sending as a SMS vs. MMS message. A message routing option may include an option of a routing provider that provides message delivery functionality to the communication platform. Within one communication protocol (such as carrier-based messaging for SMS or MMS), selecting a message routing option includes selecting a select routing service from a set of routing services. A routing provider (i.e., a routing service) can be a carrier, network, or other service provider that can facilitate routing and/or delivery of a message to a recipient. For example, a routing provider may maintain communication routes that may be used to transmit messages to their intended recipient client devices.

Preparing a message for transmission may function to alter the structure and/or format of a message. Preparing a message for transmission may include encoding message content, formatting message content, editing/sanitizing content, and/or otherwise modifying the content. Preparing a message for transmission may additionally or alternatively include altering message metadata or other messaging properties used when transmitting a message.

The method can analyze data from a message tracking system to generate a predicted routing service. As reliability of a service provider may vary depending on message content, time, destination device, and/or other factors. Diversifying messaging attempts can result in transmitting a first subset of message attempts with a first set of message routing options and a second set of message attempts with a second, different set of message routing options.

The method S100, in connection with transmitting a messaging attempt S120, can include recording messaging attempt to a message log, which functions to track messaging attempts. Recording a messaging attempt includes recording the time and properties of a messaging attempt. Recording a messaging attempt additionally include recording the message transmission configuration. A message attempt record may be recorded for each message attempt. The message attempt record can additionally record an associated account, sub-account, or other suitable namespace scope in which the messaging attempt is associated.

As will be described below, the method may involve augmentation or altering of a message prior to transmitting the message attempt in order to enable one or more delivery feedback mechanisms.

Block S130, which includes receiving delivery feedback of a message, functions to determine delivery status of one or more messaging attempts. Delivery feedback may not be received for each message and may only be received for a subset of messaging attempts. Delivery feedback can include feedback indicating successful delivery, failed delivery, or messaging error (e.g., content corrupted or altered in some way). The delivery feedback may additionally be used to indicate other types of delivery feedback such as differentiated status updates for "delivered" and "viewed" (i.e., detected user engagement whether it's viewed, clicked, used, etc.).

In particular, receiving delivery feedback can include automatically associating the delivery feedback to at least one messaging attempt of the set of messaging attempts. Automatically associating the delivery feedback to one messaging attempt can function to enable processing of delivery feedback even when such delivery feedback does not include explicit reference to an identifier of a message transmission attempt or request. Automatically associating the delivery feedback can leverage included content of the message and its eventual use within a digital system (at the destination device or another computing device of the user recipient). In one variation, delivery feedback may be associated with one messaging attempt. In some instances, use of a unique content element, such as a redirecting link or unique passcode, can be used to uniquely map the delivery feedback to a transmitted message. In other variations, delivery feedback may be automatically associated with a set of potential messaging attempts. For example, messaging attempts with the same intent (e.g., including identical content but sent multiple times) may all be selected for association with the delivery feedback.

The method may include receiving explicit delivery feedback, where the result of a messaging attempt is explicitly indicated to have some result. In some instances, delivery feedback may be implicit or assumed. For example, an external service may indicate that a message is assumed to have failed and communicate this delivery failure feedback to the communication platform if a user of the external service indicates that a message was never received.

In the case of group messages, receiving delivery feedback of a message may include receiving delivery feedback of a message and contextually associating feedback with at least one message recipient. In this variation, gathered feedback may be associated with one or more message recipients. In some variations, delivery feedback can be collected and tracked for each distinct recipient/participant.

Many forms of delivery feedback may be communicated to the communication platform via an API. Delivery feedback may alternatively be reported during http interactions with a website (e.g., during 2FA authentication), when accessing a link, or during other digital interactions.

In one variation, a cooperating application or service at the destination device, can include configuration to initiate reporting of delivery feedback in response to activity at the destination device. For example, a messaging application at a delivery device may transmit a delivery feedback message. This may include various properties such as message content, origin endpoints, destination endpoints, metadata properties, and the like. In another variation, a cooperating application or service that is makes use of the messages may alternatively receive user interaction that can be mapped to a message received at the destination device.

However, in some instances such as the link system, feedback may be determined through another external channel. A browser at the destination device or possibly at a different computing device (e.g., if a link is transferred by the user to a desktop computer), may initiate an http request for a redirected link.

As discussed, there may be many different feedback mechanisms that can be used. Some of these feedback mechanisms may be customized for a particular use case. Receiving delivery feedback of a message may vary for at least the following variations: a contextual feedback variation as shown in FIG. 7, a passcode service variation as shown in FIG. 8, and/or a link redirection variation as shown in FIG. 9.

In some variations, the method may dynamically use different types of delivery feedback adapted to the type of message. This variation can include, in association with S110 and S120, automatically determining a message type and selecting one of at least two possible delivery feedback processes, and then enabling the selected delivery feedback process. Depending on the type of delivery feedback process, an attempted transmitted message can be altered according to a process of the selected delivery feedback system. Appropriate tracking and/or data systems may also be updated. For example, a redirected link, which is exchanged for another link in the message content, may be configured for handling within a web interface of the communication platform.

Block S140, which includes updating delivery status of a message functions to alter the recorded state of a messaging attempt. In particular, the message delivery status (i.e., delivery status) of at least one messaging attempt that is tracked in a message tracking system may be updated.

Updating delivery status is preferably used in modifying and altering reporting of messaging within a communication platform. Updating delivery status may more specifically include updating delivery status of a message attempt within an accessible "message data resource". The data resources may reports on, communicate, or otherwise signal status of the message in a data system that is viewable/accessible by a communicatively connected system or device. The data resource could be used in reporting to an end-user on status of a message, reporting to a manager viewing an administrative console, reporting to a connected system, which may use delivery data for altering functionality, and/or used in other suitable ways.

In one variation, updating delivery status of a message attempt within an accessible message data resource may include updating a user interface of a user device. For example, a user device from which a message originated may be sent a signal to confirm delivery and/or confirm reading/interacting with the message. This may be used so that read receipts can be enabled for compatible user devices even if the one or more destinations does not support read receipts. In such a variation, a message may be sent from a user device (e.g., at a communication platform, receiving a message from a origin endpoint of a user device) and then that message can be attempted for delivery to a destination endpoint (e.g., making a messaging attempt to a destination). If and when delivery feedback is received, it may be used to update the delivery status of the message attempt and then communicating that status change to the end user device. This may be reflected in a message delivery message on the user device.

Updating delivery status of a message attempt within an accessible message data resource may include updating a user interface of an administrative console. This may enable a device used in monitoring a multitude of message attempts to see the deliverability of an individual messaging "intent", deliverability across a large messaging campaign, and/or deliverability broken down by other metrics. This administrative console could additionally be used in managing initiating bulk messaging and/or altering on-going or future transmission of messages. The deliverability of messages may be incorporated into dynamic control of such message controls.

In some variations, delivery feedback may be used to update delivery status of a single message attempt. In other variations, delivery feedback may be used in updating delivery status of multiple messaging attempts. For example, confirmation of a delivery after multiple unconfirmed messaging attempts may be used in updating delivery status of a confirmed message as delivered and updating delivery status of prior unconfirmed messages as undelivered.

Updating message delivery status of a message may be performed based on and (optionally) in response to received delivery feedback. In one exemplary instance of updating status of a message, delivery feedback is received for an indicated messaging attempt or possibly some message received at a destination device. The delivery feedback will generally indicate delivery status, and this can be used to update the corresponding message attempt record. Updating status of messages may additionally involve updating in response to lack of received delivery feedback. For example, updating status of a message can include updating status to indicate an error or exception in delivery in response to a time out, failed access of another attempt, successful delivery of another related message attempt.

There can be a one-to-one correspondence between delivery feedback and the message attempt record that is updated. Alternatively, updating status of a message can include identifying or selecting corresponding messaging attempts and updating the delivery status of the corresponding messaging attempts. In general, the delivery feedback will be explicit indication of delivery success. This delivery successful state may imply delivery failure of other messaging attempts. Alternatively, the delivery successful state of one messaging attempt may imply a possibly delivery failure of another messaging attempt. In some cases, multiple attempts of the same message may be confirmed as being successfully delivered.

Identifying and/or selecting corresponding messaging attempts may include searching for associated messaging attempts if messaging attempts have a shared identifier or are otherwise linked. Alternatively, identifying and/or selecting corresponding messaging attempts can include searching for message attempts satisfying a condition for being a related messaging attempt. Satisfying a condition for being a related messaging attempt may include searching for message attempts with shared or similar message content, shared delivery recipient(s), messaging requests made with timing satisfying some time pattern.

Updating delivery status of a message attempt may be performed within a message tracking system which may include one or more database systems used in modeling and tracking state of a message. In one variation, the message tracking system can enable querying the message tracking system for delivery status for messages related to a particular messaging request (and/or messaging intent). This delivery status may be used to indicate details of when a message was confirmed to have been delivered. In some implementations, such detailed data on messaging attempts and resulting delivery results can be presented. In other implementations, delivery status may be summarized for a particular message request or intent. For example, inspection of the delivery status for a particular message request may reveal if a message was confirmed to be delivered without indicating number of attempts and/or which attempt was likely delivered.

In one variation, the delivery status of message requests and/or attempts may be stored and made accessible through an API resource. An API resource can be a represented by a URI endpoint that when accessed via an API (e.g., using an authenticated HTTP GET request) returns properties of a message request including delivery status information. Accordingly, updating status of the at least one messaging attempt can include updating non-transitory computer readable memory to update an API resource with state of the at least one messaging attempt. In this way, in some implementations, a developer could inspect each messaging request through an API to inspect the delivery status.

In addition to exposing an API for active inspection, the method may incorporate programmatic alerting related to the status of a message request. Programmatic alerting may make use of a callback URI, a data-streaming protocol, and/or any suitable approach for pushing alert data to an interested system. In example embodiments, updating status of a message can include initiating, in response to a change in delivery status of the message request an outbound communication to a callback URI with the delivery status of the message.

A callback URI can be configured in association with a messaging request. In one variation, a messaging request made as part of S110 may include a callback URI property, where that callback URI is used specifically for activity of the messaging request. In another variation, a callback URI property may be set as a callback URI (e.g., a default callback URI) for an account, a sub-account, a group of messaging requests, messages using a particular origin endpoint or for any suitable class of message requests.

Figure 10:
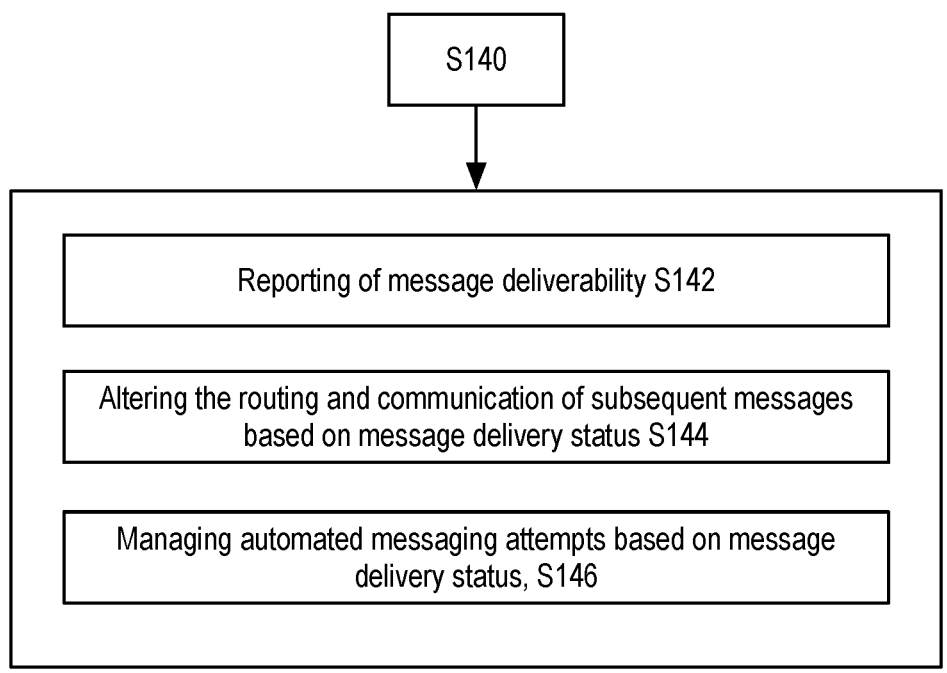
FIG. 10 is a flowchart showing exemplary responses to updates to delivery status.

Collection and management of message delivery status can be used for a variety of applications within the context of operating a communication platform. The methods that may further comprise: reporting of message deliverability S142, altering the routing and communication of subsequent messages based on message delivery status S144, managing automated messaging attempts based on message delivery status, S146 and/or facilitating other functionality within a communication system as shown in FIG. 10.

Reporting message deliverability may include generating a report or analytics on messaging requests. These may be broken down by various properties such as by time, recipients, geographic locations, message content, and/or other properties. Reporting message deliverability can include inspecting and analyzing message tracking data of the message tracking system.

Altering the routing and communication of subsequent messages can include using the results of messaging attempts and the corresponding message transmission configuration of those messaging attempts when transmitting subsequent messages. Accordingly, the method can include, when subsequently transmitting a new message attempt, selecting a routing service to use when transmitting the new message attempt, where the routing service is based (at least in part) on delivery status of the message attempt(s). In such a variation, making a set of messaging attempts in S120 can include selecting a routing service, wherein a message transmission request is sent to a selected routing service. And more specifically making a set of messaging attempts in S120 can include selecting a routing service based on delivery status of previous message attempts.

For example, altering the routing of subsequent messages may include selecting a routing provider based on delivery status of previous messages sent using that routing provider. Routing providers with more success will generally be selected more often, while routing providers with less success may be selected less often. This may be balanced with various conditions such as price, message type, contractual obligations (e.g., meeting a minimum quota threshold), and/or other factors.

Managing automated messaging attempts can include automatically reattempting message transmissions. Transmitting a reattempted message may occur based on indicated delivery failure, after some time period without confirmation of a delivery success, and/or after any suitable condition involving delivery feedback is satisfied. Accordingly, the method can include reattempting transmission of a new message attempt when a successful delivery status is not updated within a time window from a time of transmitting an original message attempt. Other conditions may additionally be used such as reattempting as long as the count of reattempts is under a maximum number of attempts. Additionally, the time windows may vary based on the count of message attempts.

As shown in FIG. 7, a method S200 for collecting messaging feedback using contextual message association of feedback can include receiving messaging requests S210, making (e.g., transmitting) messaging delivery attempts S220, receiving delivery feedback of a message and contextually associating feedback with at least one messaging attempt S230, and updating status of at least one messaging attempt S240.

The processes S210, S220, S230, and S240 are substantially similar to and may include the variations described above for processes S110, S120, S130, and S140. The method S200 however, may involve contextually associating feedback with at least one messaging attempt.

Accordingly, a variation of the method that uses contextual feedback can include: receiving a set of messaging requests to transmit a message to at least one recipient device (S110/S210); making a set of messaging attempts directed at the at least one recipient device (S120/S220); receiving delivery feedback and automatically associating the delivery feedback to one messaging attempt of the set of messaging attempts, which includes contextually associating the delivery feedback with one messaging attempt in the set of messaging attempts (S130/S230); and updating a delivery status of the at least one messaging attempt (S140/S240).

Contextually associating delivery feedback with one or more messaging attempt can use temporal properties of the delivery feedback compared to related messaging attempts. Related messaging attempts can be those that match one or a combination of messaging identifying properties such as the set or subset of participants (e.g., origin endpoint(s) and/or destination endpoint(s)) and/or messaging content. Temporal properties can be used when analyzing such as: determining and analyzing sequence of messaging attempts and delivery feedback; determining and analyzing spacing or time between messaging attempts and delivery feedback; determining and analyzing historical trends of delivery feedback for an account, a destination endpoint, or types of content; and/or determining and analyzing other timing metrics or temporal patterns.

In one variation, received delivery feedback is applied to a messaging attempt that is most recently transmitted. Contextually associating the delivery feedback with one messaging attempt in the set of messaging attempts can include determining one or more messaging attempt is the messaging attempt most recently transmitted. Additionally, after determining one or more messaging attempts that are contextually associated with delivery feedback, the method can include: in response to determining the one message attempt is the messaging attempt most recently transmitted, applying the delivery feedback to the one messaging attempt In an example of using temporal context, if three attempts are made, and delivery feedback is received after the third messaging attempt, then the delivery feedback is associated with the third messaging attempt. There may be various temporal conditions that may need to be satisfied. For example, there may be a maximum time threshold after which delivery feedback is not directly associated with one message. In some cases, the delivery status of multiple messages may be updated with some indication of possible delivery. For example, if delivery feedback is received over 24 hours after three messaging attempts, then no single messaging attempt may have delivery status updated to confirmed delivery, but all three may be updated to a status indicating that there is some chance that at least one of the three messaging attempts was successful.

Additional or alternative contextual attributes may be used. Properties of the message content, which can be communicated within the delivery feedback, may be used in determining one or more associated messaging attempts. Message content may be used in determining messaging attempts within a set of messaging attempts involving the same participants. For example, delivery feedback communicating message content may be used to determine one or more message attempts within all messaging attempts between two phone numbers. Message content can be used when the content of a message is uniquely identifying or when message content may identify a set of related messaging attempts. Message content may be particularly useful for delivery feedback when the message content is naturally different between messaging attempts.

message content may be used for determining an associated message attempt within a time window. In some instances, message content may not be unique to one message for all messages ever attempted for a destination device, but the message content may be unique within a predetermined time window around when delivery feedback was received. The time window could be fixed but may also be dynamic. One variation of a dynamic time window may use frequency and patterns of communication between the participant endpoints to segment time windows of communication interactions and identifying a messaging attempt within one or a select number of time segments around the time of the delivery feedback.

In a related variation, contextually associating feedback with at least one messaging attempt may include transmitting messaging attempt identifiers within transmitted messages, and then receiving the messaging attempt identifier with the delivery feedback. The messaging attempt identifier may be included within non-visible message metadata that may be readable at a receiving client device. The messaging attempt identifier may alternatively be encoded or otherwise embedded into the message content. If the message includes a media file such as an image or video file, the media file may be transformed to incorporate an identifier. The identifier can be substantially non-visible to an end user but made to be easily extracted at the client device. For example, the identifier may be invisibly encoded into an MMS transmitted image; the identifier is extracted at the receiving client device, and then included in a delivery feedback communication to the communication platform. Accordingly, the method may include, in association with transmitting a messaging attempt embedding an identifier in the message attempt and decoding the identifier from data of a delivered message. The decoding to determine the identifier could occur at the destination device, and the identifier sent as part of the delivery feedback. Decoding could alternatively occur at the communication platform, wherein data of a delivered message can be communicated as part of the delivery feedback, which is then decoded.

Embedding an identifier can include encoding the identifier in a media file (e.g., audio, image, or video file).

Embedding an identifier could also be in using message content manipulation to change textual content to signal identifiers. The identifier may not need to be globally unique but could be used for differentiating between a small pool of possible attempts. In one example, textual manipulation of punctuation, augmenting white space characters (e.g., adding extra spaces, or using alternative), swapping similar characters, and/or other forms of textual manipulation.

As shown in FIG. 8, a method S300 for collecting messaging feedback using a passcode service can include receiving messaging requests for passcode delivery S310, making (e.g., transmitting) passcode messaging delivery attempts S320, determining delivery feedback based on passcode usage S330, and updating status of the indicated messaging attempt S340.

The processes S310, S320, S330, and S340 can be substantially similar to and may include the variations described above for processes S110, S120, S130, and S140. The method S300 however, can be customized to leverage the delivery and verification of passcodes as a mechanism for determining status of message delivery.

Accordingly, a variation of the method that uses passcode feedback can include: receiving a set of messaging requests to transmit a message to at least one recipient device, wherein the messaging requests are for passcode delivery (S110/S310); making a set of passcode messaging attempts directed at the at least one recipient device (S120/S320); receiving delivery feedback and automatically associating the delivery feedback to one messaging attempt of the set of messaging attempts based on passcode usage (S130/S330); and updating a delivery status of the at least one messaging attempt, which includes, in response to successful passcode usage, updating the delivery status to indicate successful delivery (S140/S340).

In such passcode variations of the method, a message that includes a passcode is transmitted within the message content of a message attempt. The passcode will, in some implementations, be transmitted so that an end user may use the passcode for some action. One example of use would be to use the passcode during multi-factor authentication with some digital service. In some variations, digital multi-factor authentication may be implemented and facilitated through the computing platform implementing the method. In other variations, digital multi-factor authentication may alternatively be implemented and facilitated through an external computing system. Other examples of use could be sending a passcode as a purchase code, a coupon, or some other content that can be used within a digital interaction after receiving the message.

Usage of the passcode can enable the communication platform to receive a signal (either from an outside system or from the user using the passcode during authentication) indicating attempted use of a passcode. Accordingly, determining delivery feedback of the message attempt can include determining attempted usage of a passcode. The attempted usage of the passcode may be successful, in which case this can indicate successful communication of the passcode. The attempted usage of the passcode may alternatively be failed entry of the passcode. This may happen if the message content was corrupted or improperly communicated, if some other user is attempting to guess the passcode, if a time window for entry of the passcode expires, and/or resulting from other errors or exceptions during the authentication process.

The delivery status can be based on and depend on communicated indication of passcode usage and the lack of any passcode usage. In one variation, updating a delivery status of the at least one messaging attempt can include, in response to successful passcode usage, updating the delivery status to indicate successful delivery. Updating a delivery status of the at least one messaging attempt may additionally include: in response to passcode usage errors or exceptions, updating (or maintaining) the delivery status to indicate no positive confirmation of delivery. In some implementations, the delivery status may be initialized to an undelivered delivery status and updated to a successful delivery if and when successful passcode usage is determined. Descriptive labels for the status may vary but can be based on different status that depend on successful use of passcode and lack of successful use of a passcode. In some instances, there could be three states of the delivery status: one for when no passcode usage has been attempted, when successful passcode usage has occurred, and/or when passcode usage was performed but unsuccessful.

In one variation, method S300 may be implemented alongside an external passcode service or system implementation. For example, message content may be analyzed and messages containing passcodes may be automatically detected and tracked so that passcode-based delivery feedback can be used.

In other variations, method S300 may be implemented in coordination with a passcode service. For example, the communication platform may at least partially facilitate generating, tracking, and/or verifying passcodes. These authentication services can be coordinated with confirmed message delivery as indicated by successful usage of a passcode.

Block S310, which includes receiving messaging requests for passcode delivery functions to establish a passcode as a mechanism through which success of message delivery can be tracked.

As mentioned for one variation, the passcode can be generated and set outside of the communication platform. Accordingly, the passcode may be detected in the message content of a message request. In a variation with cooperative passcode service, receiving a message request for passcode delivery may initiate generating a passcode for including in a transmitted message. The message request may not state the passcode but instead delegate the creation of the passcode to the communication platform.

The passcode may be varied across each associated message attempt. In other words, there may be a unique association between a passcode and message attempt within the context of a group of related message attempts. Passcodes may be repeated across different recipients, and passcodes may be repeated across different messaging attempt contexts. For example, a passcode may be reused across different authentication session attempts separated by several days.

Block S330, which includes determining delivery feedback based on passcode usage, functions to use the passcode as a way to associate messaging attempts with attempted or successful usage of a passcode. When a passcode is successfully used after a message attempt, it can serve as a signal that the message attempt was successful in communicating the passcode. When a passcode is corrupted during transmission, then a failed passcode entry may be detected which may indicate a message content. corruption issue as a form of delivery feedback. When an updated passcode request is made, it can indicate that the previous passcodes were not successfully communicated.

In one variation, determining delivery feedback based on passcode usage S330 can include receiving delivery feedback of a message indicating a received passcode and mapping the received passcode to an indicated messaging attempt. This variation uses passcodes as a type of messaging attempt identifier. In some variations, the passcode may be encoded or hashed during when communicated within a delivery feedback message to avoid explicit indication of a passcode. The received passcode is then used to lookup a corresponding messaging attempt. If one is found, then that message attempt can have status updated to being a successful message attempt.

In another variation, the method may additionally include providing a passcode verification service. This variation may be used if the communication platform additionally provides authentication services to developers to assist in implementing various forms of authentication such as two-factor authentication or one time password authentication. Providing passcode verification can include receiving a passcode verification request, which will result in subsequent authentication verification processing, but can additionally include reviewing passcode verification requests for indication of delivery feedback. Reviewing passcode verification request for indication of delivery feedback can including looking for and determining matches between messaging attempts and passcode verification requests with the corresponding recipient and passcode pairs. The passcode verification request will generally be supplied by a service using the passcode as a form of authentication and/or authorization code. Direct access to the recipient client device is not needed since it can be based on the passcode provided by the user of the recipient device.

As shown in FIG. 9, a method S400 for collecting messaging feedback using a link redirection service can include receiving messaging requests including a link S410, transmitting messaging attempts where each messaging delivery attempt includes a unique redirecting link S420, receiving an access request at a redirecting link associated with a messaging attempt S430, and updating status of the messaging attempt S440. This method variation may use a link redirection service as a mechanism for detecting if a message was delivered and then acted upon. This method variation can be used with any message that includes a link.

The processes S410, S420, S430, and S440 can be substantially similar to and may include the variations described above for processes S110, S120, S130, and S140. The method S400 however, can be customized to facilitate the transformation of a message to include a redirecting link and to track access of the redirecting link.

Accordingly, a variation of the method that uses link feedback can include: receiving a set of messaging requests to transmit a message to at least one recipient device, wherein a messaging request specifies (e.g., defines as a property) messaging content that includes a link (S110/S410); transmitting a set of messaging attempts directed at the at least one recipient device, which includes making a messaging attempt for the messaging request using a redirecting link in place of the link (S120/S420); receiving delivery feedback and automatically associating the delivery feedback to one messaging attempt of the set of messaging attempts, which includes receiving an access request at the redirecting link as indication of message successful delivery (S130/S430); and updating a delivery status of the at least one messaging attempt (S140/S440).

A message tracking system can be updated through S440, when receiving the access request at the redirecting link. Additionally, the method can include redirecting the access request to the link (e.g., the original link). For example, when a message request is initiated with a link to a store, a message with a redirecting link may be sent to a destination device. If delivered, a user may click or otherwise activate the link (on the destination device or another device), which results in an access request that is directed to the redirecting link. The redirecting link will generally be a URI/URL registered and controlled by the implementing communication platform. The access request may be an HTTP GET request communicated from a browser or any suitable type of communication request. The communication platform can redirect that request to the original link so that the user can access the store.

When using redirecting link feedback, the method can include, for repeated messaging attempts of the same message content, using redirecting links that are unique to each messaging attempt. In this way access requests to any redirecting link can be uniquely mapped to one messaging attempt.

The method may be automatically used when a message request includes a link. In some implementations, the messaging request may explicitly indicate to activate link redirection delivery feedback. As a similar alternative, automatic conversion of links to redirection links may be an account setting so that by default conversion of links is performed. If the message content of a message request does not include a link, then an alternative delivery feedback mechanism may be used.

Prior to transmitting a messaging attempt, the method includes converting a link in message content of a messaging request into a unique redirecting link S415. This can include augmenting or changing the message content. A link will generally be a URL link to a web resource. A link may alternatively be a deep link to an application resource or any suitable type of link that specifies where to direct application state. The redirecting link is one that may be managed by the communication platform and serves as an intermediary link. Access of the redirecting link enables the access request to be detected and then the communication platform redirects to the original linked destination. Each messaging attempt may receive its own unique redirection link so that any access attempts can be associated with a corresponding messaging attempt.

Block S430, which includes receiving an access request at a redirecting link associated with a messaging attempt, functions to detect when some form of access is being made. In general, an access request will be a result of a user clicking or otherwise accessing a redirecting link from a delivered message. This form of user access request is used as an indication of delivery success. More specifically, that form of access request can be tracked as a message state associated with user engagement because the message was not only delivered but a user interacted with the message.

In some variations, a messaging client may provide some form of link preview capabilities where the messaging client or service will access links in messages to generate a preview such as by requesting a preview image and/or a small portion of content. Accordingly, an access request may be initiated by such messaging client or service prior to a user viewing or interacting with the redirecting link The redirecting link may detect such preview access requests by testing the type of client requesting the content. Preview access requests may be indicative of delivery success if the client application performs those actions when a link is detected within a received messaging client. In some variations, updating the delivery status of a messaging attempt can include updating to a delivered status in response to detecting a preview access request (e.g., detecting automated access initiated when delivered to the destination device) and updating to a "user interacted" status (e.g., "viewed" or "clicked") in response to detecting a user-initiated access request.

In some instances, a carrier network (or another communication network operator) may check links as a form of safety check or other forms of processing when facilitating transmission of a message. The method can include analyzing and/or classifying access patterns across routing options (timing, mode of access, user agent etc.), which functions to enable determining transmission-related access requests for a redirecting link. Transmission-related access requests to a redirecting link may serve some utility in analyzing how a message attempt was routed. In some variations, however, such transmission-related access requests may be ignored with respect to how they impact delivery status. Accordingly, the method may include filtering transmission-related access requests of a link, which could be made by the routing service (e.g., a network operator or other downstream communication system) used in transmitting a message.

In this way, the method may determine which routing services (e.g., communication networks) have high "click rates" or other indicators that they perform check verification. This can be implemented by tracking access requests and then analyzing access requests by network operators. The analysis may further determine which type of messages receive such network-initiated access requests, which may be based on message content, origin properties, transmission properties (e.g., sending high volumes of a message), and other properties. These network access attempts can be accounted for in the analytics when determining delivery status and delivery rates.

Software Architecture

Figure 11:
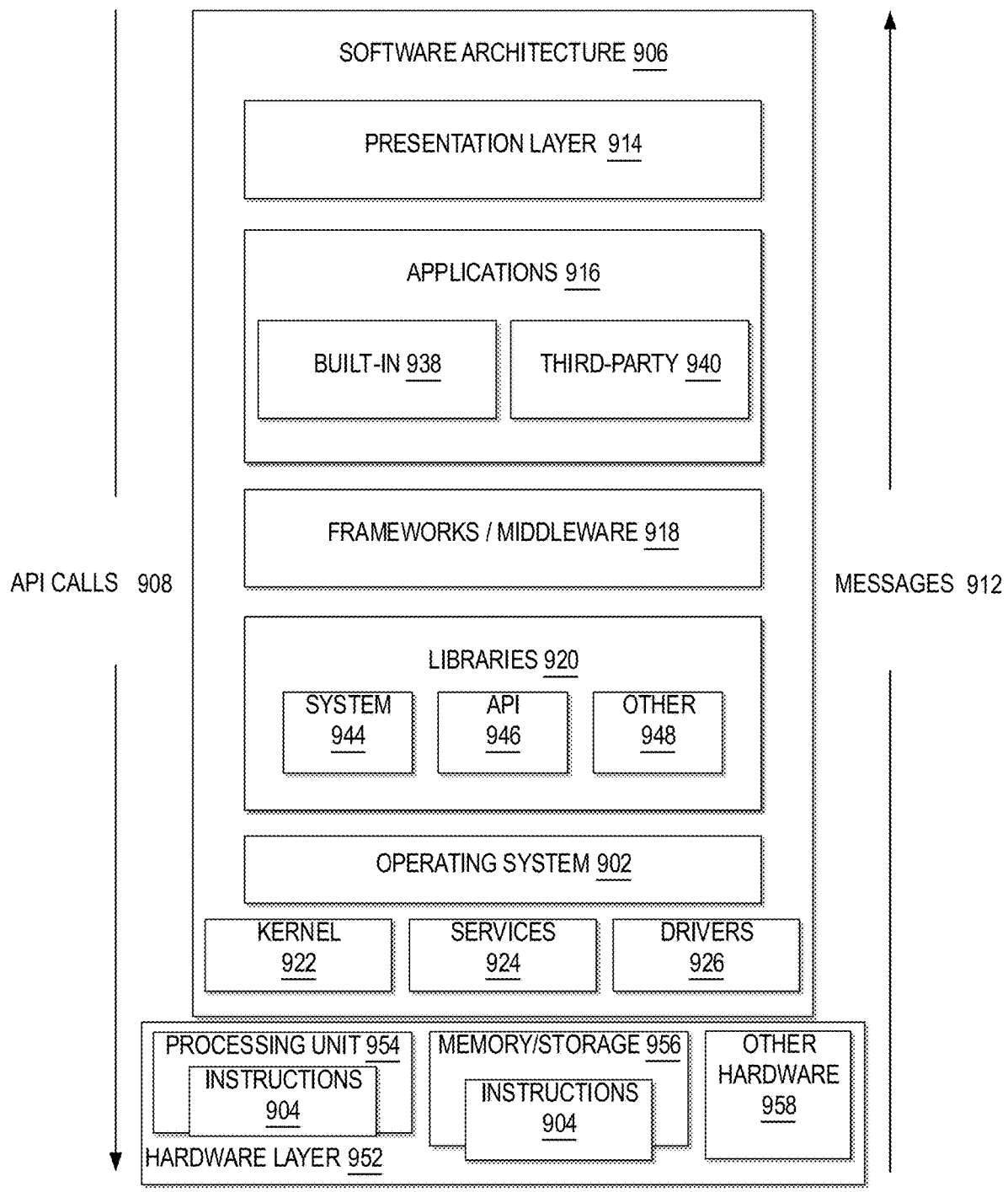
FIG. 11 is a block diagram illustrating components of a machine, according to some example embodiments, able to read instructions from a machine-readable medium (e.g., a machine-readable storage medium) and perform any one or more of the methodologies discussed herein.

FIG. 11 is a block diagram illustrating an example software architecture 906, which may be used in conjunction with various hardware architectures herein described. FIG. 11 is a non-limiting example of a software architecture 906 and it will be appreciated that many other architectures may be implemented to facilitate the functionality described herein. The software architecture 906 may execute on hardware such as machine 1000 of FIG. 12 that includes, among other things, processors 1004, memory 1014, and (input/output) I/O components 1018. A representative hardware layer 952 is illustrated and can represent, for example, the machine 1000 of FIG. 12. The representative hardware layer 952 includes a processing unit 954 having associated executable instructions 904. Executable instructions 904 represent the executable instructions of the software architecture 906, including implementation of the methods, components, and so forth described herein. The hardware layer 952 also includes memory and/or storage modules 956, which also have executable instructions 904. The hardware layer 952 may also comprise other hardware 958.

In the example architecture of FIG. 11, the software architecture 906 may be conceptualized as a stack of layers where each layer provides particular functionality. For example, the software architecture 906 may include layers such as an operating system 902, libraries 920, frameworks/middleware 918, applications 916, and a presentation layer 914. Operationally, the applications 916 and/or other components within the layers may invoke application programming interface (API) calls 908 through the software stack and receive a response such as messages 912 in response to the API calls 908. The layers illustrated are representative in nature and not all software architectures have all layers. For example, some mobile or special purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924, and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 920 provide a common infrastructure that is used by the applications 916 and/or other components and/or layers. The libraries 920 provide functionality that allows other software components to perform tasks in an easier fashion than to interface directly with the underlying operating system 902 functionality (e.g., kernel 922, services 924, and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 (also sometimes referred to as middleware) provide a higher-level common infrastructure that may be used by the applications 916 and/or other software components/modules. For example, the frameworks/middleware 918 may provide various graphical user interface (GUI) functions, high-level resource management, high-level location services, and so forth. The frameworks/middleware 918 may provide a broad spectrum of other APIs that may be used by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. Third-party applications 940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 940 may invoke the API calls 908 provided by the mobile operating system (such as operating system 902) to facilitate functionality described herein.

The applications 916 may use built in operating system functions (e.g., kernel 922, services 924, and/or drivers 926), libraries 920, and frameworks/middleware 918 to create UIs to interact with users of the system. Alternatively, or additionally, in some systems, interactions with a user may occur through a presentation layer, such as presentation layer 914. In these systems, the application/component "logic" can be separated from the aspects of the application/component that interact with a user.

Figure 12:
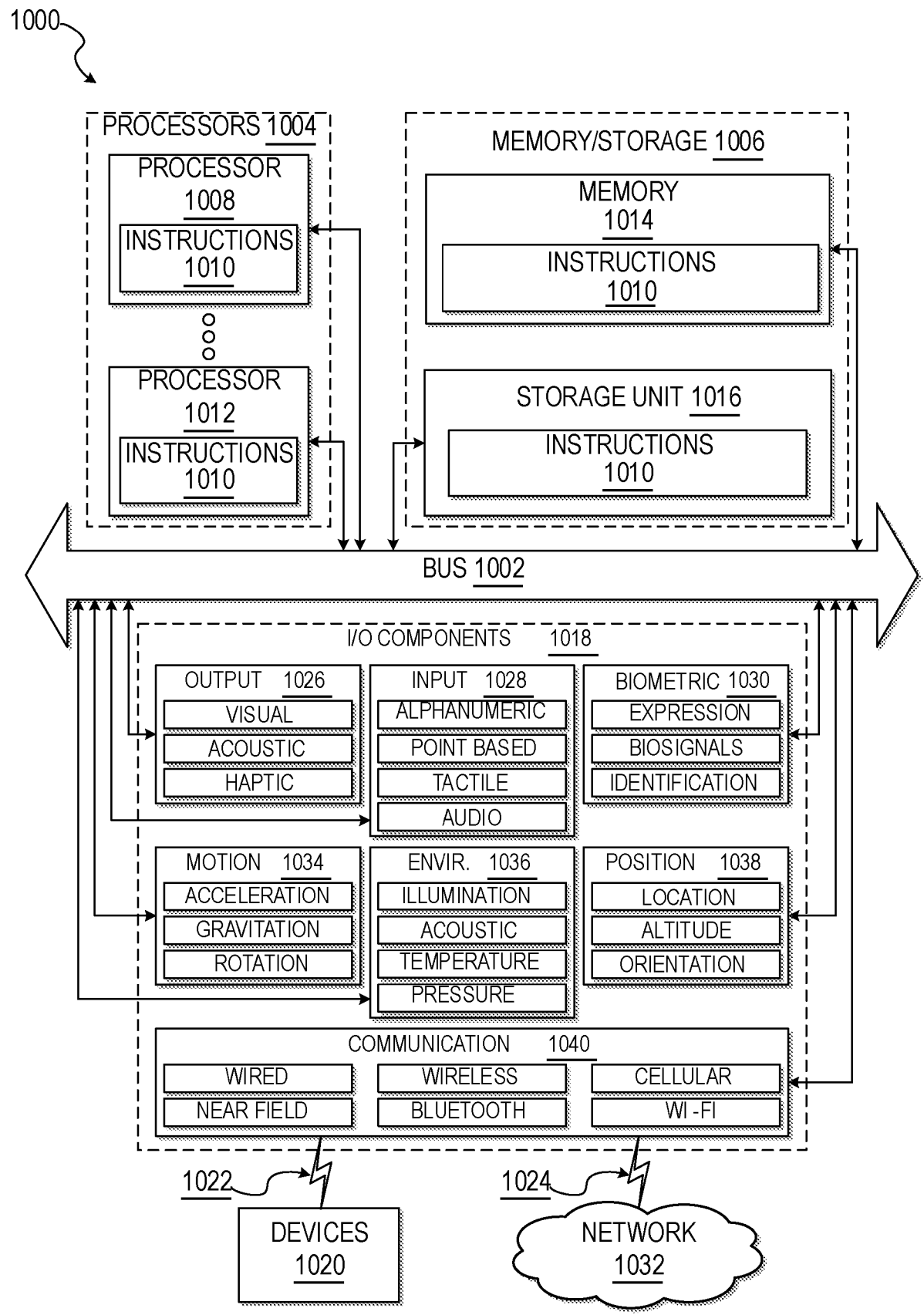
FIG. 12 is a block diagram illustrating components of a machine, according to some example embodiments, able to read instructions from a machine-readable medium (e.g., a machine-readable storage medium) and perform any one or more of the methodologies discussed herein.

FIG. 12 is a block diagram illustrating components of a machine 1000, according to some example embodiments, able to read instructions 904 from a machine-readable medium (e.g., a machine-readable storage medium) and perform any one or more of the methodologies discussed herein. Specifically, FIG. 12 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 1000 capable of executing the instructions 1010, sequentially or otherwise, that specify actions to be taken by machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory/storage 1006, and I/O components 1018, which may be configured to communicate with each other such as via a bus 1002. The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 12. The I/O components 1018 are grouped according to functionality merely for simplifying the following discussion and the grouping is in no way limiting. In various example embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1018 may include biometric components 1030, motion components 1034, environmental components 1036, or position components 1038 among a wide array of other components. For example, the biometric components 1030 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1034 may include acceleration sensor components (e.g., accelerometer), gravitation sensor components, rotation sensor components (e.g., gyroscope), and so forth. The environmental components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1038 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1032 or devices 1020 via coupling 1024 and coupling 1022, respectively. For example, the communication components 1040 may include a network interface component or other suitable device to interface with the network 1032. In further examples, communication components 1040 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1020 may be another machine or any of a wide variety of peripheral devices (e.g., a peripheral device coupled via a USB).

Moreover, the communication components 1040 may detect identifiers or include components operable to detect identifiers. For example, the communication components 1040 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040 such as location via Internet Protocol (IP) geo-location, location via Wi-Fi® signal triangulation, location via detecting an NFC beacon signal that may indicate a particular location, and so forth.

Glossary

"CARRIER SIGNAL" in this context refers to any intangible medium that is capable of storing, encoding, or carrying instructions 1010 for execution by the machine 1000, and includes digital or analog communications signals or other intangible medium to facilitate communication of such instructions 1010. Instructions 1010 may be transmitted or received over the network 1032 using a transmission medium via a network interface device and using any one of a number of well-known transfer protocols.

"CLIENT DEVICE" in this context refers to any machine 1000 that interfaces to a communications network 1032 to obtain resources from one or more server systems or other client devices. A client device may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 1032.

"COMMUNICATIONS NETWORK" in this context refers to one or more portions of a network 1032 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 1032 or a portion of a network 1032 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 1010 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 1010. The term "machine-readable medium" shall also be taken to include any medium, or combination of multiple media, that is capable of storing instructions 1010 (e.g., code) for execution by a machine 1000, such that the instructions 1010, when executed by one or more processors 1004 of the machine 1000, cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or software logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 1004) may be configured by software (e.g., an application 916 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 1004 or another programmable processor 1004. Once configured by such software, hardware components become specific machines 1000 (or specific components of a machine 1000) uniquely tailored to perform the configured functions and are no longer general-purpose processors 1004. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 1004 configured by software to become a special-purpose processor, the general-purpose processor 1004 may be configured as respectively different special-purpose processors (e.g., comprising different hardware components) at different times. Software accordingly configures a particular processor or processors 1004, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 1002) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 1004 that are temporarily configured (e.g., by software) or permanently configured to perform the relevant operations. Whether temporarily or permanently configured, such processors 1004 may constitute processor-implemented components that operate to perform one or more operations or functions described herein. As used herein, "processor-implemented component" refers to a hardware component implemented using one or more processors 1004. Similarly, the methods described herein may be at least partially processor-implemented, with a particular processor or processors 1004 being an example of hardware. For example, at least some of the operations of a method may be performed by one or more processors 1004 or processor-implemented components. Moreover, the one or more processors 1004 may also operate to support performance of the relevant operations in a "cloud computing" environment or as a "software as a service" (SaaS). For example, at least some of the operations may be performed by a group of computers (as examples of machines 1000 including processors 1004), with these operations being accessible via a network 1032 (e.g., the Internet) and via one or more appropriate interfaces (e.g., an API). The performance of certain of the operations may be distributed among the processors 1004, not only residing within a single machine 1000, but deployed across a number of machines 1000. In some example embodiments, the processors 1004 or processor-implemented components may be located in a single geographic location (e.g., within a home environment, an office environment, or a server farm). In other example embodiments, the processors 1004 or processor-implemented components may be distributed across a number of geographic locations.

"PROCESSOR" in this context refers to any circuit or virtual circuit (a physical circuit emulated by logic executing on an actual processor 1004) that manipulates data values according to control signals (e.g., "commands," "op codes," "machine code," etc.) and which produces corresponding output signals that are applied to operate a machine 1000. A processor 1004 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 1004 may further be a multi-core processor having two or more independent processors 1004 (sometimes referred to as "cores") that may execute instructions 1010 contemporaneously.

What is claimed is:

1. A method comprising:
    receiving, by a communication platform and via an application programming interface (API), a plurality of messaging requests to transmit a plurality of messages to a plurality of recipient devices;
    identifying subsets of related messaging requests in the plurality of messaging requests, wherein each subset of related messaging requests includes a messaging request corresponding to an initial transmission of a respective message to at least one recipient device of the plurality of recipient devices and one or more messaging requests corresponding to one or more repeated transmissions of the respective message to the at least one recipient device;
    receiving a plurality of delivery feedbacks for the plurality of messages;
    for each of the subsets of the related messaging requests, determining, based on the plurality of delivery feedbacks, whether to initiate at least one repeated transmission of a respective message to at least one recipient device; and
    upon determining to initiate the at least one repeated transmission, monitoring a delivery status of the respective message to the at least one recipient device.

2. The method of claim 1, wherein the subsets of related messaging requests are identified in the plurality of messaging requests using a trained machine learning model.

3. The method of claim 1, wherein:
each message of the plurality of messages corresponds to a delivery feedback type of a plurality of delivery feedback types; and
the received plurality of delivery feedbacks are of the plurality of delivery feedback types.

4. The method of claim 3, further comprising:
automatically determining, for the message of the plurality of messages, which messaging attempt of the plurality of messaging attempts a delivery feedback of a corresponding delivery feedback type is to be mapped to, and associating the delivery feedback of the corresponding delivery feedback type with at least one determined messaging attempt of the plurality of messaging attempts; and
updating a delivery status of the at least one determined messaging attempt in an accessible message data resource that communicates status of the message.

5. The method of claim 4, wherein associating the delivery feedback of the corresponding delivery feedback type with at least one determined messaging attempt comprises contextually associating the delivery feedback with one messaging attempt in the plurality of messaging attempts.

6. The method of claim 5, wherein contextually associating the delivery feedback with the one messaging attempt in the plurality of messaging attempts comprises determining the one messaging attempt is a messaging attempt most recently transmitted, and in response to determining the one message attempt is the messaging attempt most recently transmitted, applying the delivery feedback to the one messaging attempt.

7. The method of claim 1, further comprising making a new message attempt, which comprises selecting a routing service to use when making the new message attempt based in part on a delivery status of the message attempt.

8. The method of claim 1, further comprising reattempting transmission of a new message attempt when a successful delivery status is not updated for the message attempt within a time window from a time of making the message attempt.

9. The method of claim 1, further comprising initiating, in response to a change in delivery status of a message request, an outbound communication to a callback universal resource identifier (URI) with the delivery status of the message request.

10. A system comprising:
one or more computer processors; and
one or more computer-readable mediums storing instructions that, when executed by the one or more computer processors, cause the system to perform operations comprising:
receiving, via an application programming interface (API), a plurality of messaging requests to transmit a plurality of messages to a plurality of recipient devices;
identifying subsets of related messaging requests in the plurality of messaging requests, wherein each subset of related messaging requests includes a messaging request corresponding to an initial transmission of a respective message to at least one recipient device of the plurality of recipient devices and one or more messaging requests corresponding to one or more repeated transmissions of the respective message to the at least one recipient device;
receiving a plurality of delivery feedbacks for the plurality of messages;
for each of the subsets of the related messaging requests, determining, based on the plurality of delivery feedbacks, whether to initiate at least one repeated transmission of a respective message to at least one recipient device; and
upon determining to initiate the at least one repeated transmission, monitoring a delivery status of the respective message to the at least one recipient device.

11. The system of claim 10, wherein the subsets of related messaging requests are identified in the plurality of messaging requests using a trained machine learning model.

12. The system of claim 10, wherein:
each message of the plurality of messages corresponds to a delivery feedback type of a plurality of delivery feedback types; and
the received plurality of delivery feedbacks are of the plurality of delivery feedback types.

13. The system of claim 10, the operations further comprising making a new message attempt, which comprises selecting a routing service to use when making the new message attempt based in part on a delivery status of the message attempt.

14. The system of claim 10, the operations further comprising reattempting transmission of a new message attempt when a successful delivery status is not updated for the message attempt within a time window from a time of making the message attempt.

15. The system of claim 10, the operations further comprising initiating, in response to a change in delivery status of a message request, an outbound communication to a callback universal resource identifier (URI) with the delivery status of the message request.

16. A non-transitory computer-readable medium storing instructions that, when executed by one or more computer processors of one or more computing devices, cause the one or more computing devices to perform operations comprising:
receiving, via an application programming interface (API), a plurality of messaging requests to transmit a plurality of messages to a plurality of recipient devices;
identifying subsets of related messaging requests in the plurality of messaging requests, wherein each subset of related messaging requests includes a messaging request corresponding to an initial transmission of a respective message to at least one recipient device of the plurality of recipient devices and one or more messaging requests corresponding to one or more repeated transmissions of the respective message to the at least one recipient device;
receiving a plurality of delivery feedbacks for the plurality of messages;
for each of the subsets of the related messaging requests, determining, based on the plurality of delivery feedbacks, whether to initiate at least one repeated transmission of a respective message to at least one recipient device; and
upon determining to initiate the at least one repeated transmission, monitoring a delivery status of the respective message to the at least one recipient device.

17. The non-transitory computer-readable medium of claim 16, wherein the subsets of related messaging requests are identified in the plurality of messaging requests using a trained machine learning model.

18. The non-transitory computer-readable medium of claim 16, wherein:
- each message of the plurality of messages corresponds to a delivery feedback type of a plurality of delivery feedback types; and
- the received plurality of delivery feedbacks are of the plurality of delivery feedback types.

19. The non-transitory computer-readable medium of claim 16, the operations further comprising making a new message attempt, which comprises selecting a routing service to use when making the new message attempt based in part on a delivery status of the message attempt.

20. The non-transitory computer-readable medium of claim 16, the operations further comprising reattempting transmission of a new message attempt when a successful delivery status is not updated for the message attempt within a time window from a time of making the message attempt.

* * * * *